(12) United States Patent
Voytik-Harbin et al.

(10) Patent No.: US 12,458,669 B2
(45) Date of Patent: Nov. 4, 2025

(54) COLLAGEN ENCAPSULATION OF INSULIN-PRODUCING CELLS

(71) Applicant: Purdue Research Foundation, West Lafayette, IN (US)

(72) Inventors: Sherry L. Voytik-Harbin, Zionsville, IN (US); Clarissa Hernandez Stephens, Indianapolis, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 371 days.

(21) Appl. No.: 16/633,549

(22) PCT Filed: Jul. 24, 2018

(86) PCT No.: PCT/US2018/043539
§ 371 (c)(1),
(2) Date: Jan. 23, 2020

(87) PCT Pub. No.: WO2019/023266
PCT Pub. Date: Jan. 31, 2019

(65) Prior Publication Data
US 2020/0206275 A1    Jul. 2, 2020

Related U.S. Application Data

(60) Provisional application No. 62/536,535, filed on Jul. 25, 2017.

(51) Int. Cl.
*A61K 35/39* (2015.01)
*A61K 9/00* (2006.01)
*A61K 38/28* (2006.01)
*A61K 38/39* (2006.01)
*A61K 31/343* (2006.01)
*A61K 31/5377* (2006.01)

(52) U.S. Cl.
CPC ............ *A61K 35/39* (2013.01); *A61K 9/0019* (2013.01); *A61K 38/28* (2013.01); *A61K 38/39* (2013.01); *A61K 31/343* (2013.01); *A61K 31/5377* (2013.01)

(58) Field of Classification Search
CPC ................................. A61K 35/39; A61K 38/39
See application file for complete search history.

(56) References Cited

U.S. PATENT DOCUMENTS

| 11,739,291 B2* | 8/2023 | Voytik-Harbin | ..... C12N 5/0658 435/1.1 |
| 11,919,941 B2* | 3/2024 | Rickus | ................. C12N 5/0012 |
| 2006/0134072 A1 | 6/2006 | Pedrozo et al. | |
| 2010/0272697 A1* | 10/2010 | Naji | .................. A61K 35/39 424/93.21 |

FOREIGN PATENT DOCUMENTS

| AU | 48841/99 A | 3/2000 | |
| KR | 101202086 B1 * | 11/2012 | ............. A61K 35/39 |
| WO | 00/47219 A2 | 8/2000 | |
| WO | 2008/124169 A2 | 10/2008 | |
| WO | 2016033322 A1 | 3/2016 | |
| WO | WO-2016172365 A1 * | 10/2016 | ............. C07K 14/78 |
| WO | 2017/044847 A1 | 3/2017 | |

OTHER PUBLICATIONS

Blum, K.M., et al. Biomater. Sci.;4:711-723. (Year: 2016).*
Stephens et al. (Am. J Physiol. Endocrinol Metab. Jun. 12, 2018 315: E650-E661) (Year: 2018).*
Kreger et al. (Biopolymers 2010 93(8): 690-707, IDS) (Year: 2010).*
Kuo Ching Chao et al: "A Novel Human Stem Cell Coculture System that Maintains the Survival and Function of Culture Islet-Like Cell Clusters", Cell Transplantation, Jun. 1, 2008 (Jun. 1, 2008), pp. 657-664.
Bailey J L, Critser P J, Whittington C, Kuske J L, Yoder M C, Voytik-Harbin S L; Collagen oligomers modulate physical and biological properties of three-dimensional self-assembled matrices, Biopolymers (2011) 95(2):77-93 Kreger S T, Bell B J, Bailey J, Stites E, Kuske J, Waisner B, Voytik-Harbin S L; Polymerization and matrix physical properties as important design considerations for soluble collagen formulations, Biopolymers (2010) 93(8):690-707.
Kreger S T, Bell B J, Bailey J, Stites E, Kuske J, Waisner B, Voytik-Harbin S L; Polymerization and matrix physical properties as important design considerations for soluble collagen formulations, Biopolymers (2010) 93(8):690-707.
Stevens et al., Oligomeric collagen as an encapsulation material for islet/B-cell replacement: effect of islet source, dose, implant site, and administration format, Am J Physiol. Endocrinol. Metab 319: E388-E400, (2020).
Stephens CH, Orr KS, Acton AJ, Tersey SA, Mirmira RG, Considine RV, Voytik-Harbin SL. In situ type I oligomeric collagen microencapsulation promotes islet longevity and function in vitro and in vivo. Am J Physiol Endocrinol Metab 315: E650-E66J, (2018).
De Vos et al. Polymers in cell encapsulation from an enveloped cell perspective. Adv Drug Deliv Rev. Apr. 2014;67-68:15-34. doi: 10.1016/j.addr.2013.11.005. Epub Nov. 22, 2013. PMID: 24270009.
Hosseini-Tabatabaei et al. Immunoprotection and Functional Improvement of Allogeneic Islets in Diabetic Mice, Using a Stable Indoleamine 2,3-Dioxygenase Producing Scaffold. Transplantation. Jul. 2015;99(7):1341-8. doi: 10.1097/TP.0000000000000661. PMID: 25769070.

(Continued)

*Primary Examiner* — Peter J Reddig
(74) *Attorney, Agent, or Firm* — Barnes & Thornburg LLP

(57) ABSTRACT

Compositions comprising collagen and insulin-producing cells are provided. Processes for making such a collagen and insulin-producing cell compositions are also provided. Methods for controlling, or lowering blood glucose levels and treating metabolic disorders in mammals, including type 1 diabetes, with such compositions are further provided. Methods to prolong insulin-producing cell viability and function in vitro or during transport are also provided.

8 Claims, 19 Drawing Sheets

(56) References Cited

OTHER PUBLICATIONS

Desai et al. Advances in islet encapsulation technologies. Nat Rev Drug Discov. May 2017;16(5):338-350. doi: 10.1038/nrd.2016.232. Epub Dec. 23, 2016. Erratum in: Nat Rev Drug Discov. Apr. 28, 2017;16(5):367. PMID: 28008169.
Antoine Elizabeth E. et al: "Review of Collagen I Hydrogels for Bioengineered Tissue Microenvironments: Characterization of Mechanics, Structure, and Transport", Tissue engineering Part B, vol. 20, No. 6, Dec. 1, 2014 (Dec. 1, 2014), pp. 683-696, XP093036461 , US ISSN: 1937-3368, DOI: 10.1089/ten.teb.2014.0086.
European Office Action issued for application No. EP18839425.8, dated Feb. 17, 2025.
Llacua Alberto et al: "Extracellular matrix components supporting human islet function in alginate-based immunoprotective microcapsules for treatment of diabetes", Journal of Biomedical Materials Research Part A, vol. 104, No. 7, Jul. 1, 2016 (Jul. 1, 2016), pp. 1788-1796, XP093249498, US ISSN: 1549-3296, DOI: 10.1002/jbm.a.35706.

* cited by examiner

COLLAGEN ENCAPSULATION OF INSULIN-PRODUCING CELLS

CROSS-REFERENCE TO RELATED APPLICATIONS

The present application is a U.S. national stage under 35 U.S.C. § 371 of International Application No. PCT/US2018/043539, filed Jul. 24, 2018, which claims the benefit of and priority to U.S. Provisional Application No. 62/536,535, filed Jul. 25, 2017, the entire disclosures of which are expressly incorporated herein by reference in their entireties.

Pancreatic islets contain several types of cells, including beta cells that produce the hormone insulin. When the level of blood glucose, also called blood sugar, rises after a meal, the pancreas responds by releasing insulin into the bloodstream. Insulin helps cells throughout the body absorb glucose from the bloodstream and use it for energy.

It is estimated that about 1.25 million Americans, including both children and adults, are inflicted with type 1 diabetes. Diabetes also affects veterinary patients, including dogs and cats, with an incidence of 1 to 2 percent. Patients with type 1 diabetes have damaged beta cells and therefore require lifelong insulin therapy. Most require 2 or more injections of insulin daily, with doses adjusted on the basis of self-monitoring of blood glucose levels. Although such insulin therapy is life-saving, it provides inferior control compared to functional pancreatic islet cells and does not eliminate chronic complications that decrease quality of life, lead to premature death, and account for a large percentage of medical costs. Replacing beta cell function via cell-based therapies such as islet transplantation or transplantation of other insulin-producing cells is an attractive alternative to standard-of-care exogenous insulin administration or whole pancreas transplantation because of reduced surgical risks and impositions on patient quality of life.

At present, clinical islet transplantation for human patients involves isolation of a large number of islets from multiple human cadaveric donor pancreases followed by infusion through the portal vein into the liver where they become lodged. Although successes associated with the Edmonton protocol and a recent multi-center phase III clinical trial highlight the potential of pancreatic islet transplantation, a number of persistent obstacles preclude it from gaining more widespread use.

One challenge is that there exists a limited supply of high quality human donor islets for transplant. Upon islet isolation and conventional in-vitro culture in suspension, the insulin-producing beta cells undergo rapid cell death and lose their glucose-sensitive insulin release function, which has been attributed to the loss of critical cell-extracellular matrix interactions, biophysical cues, and vascularization. The lack of in-vitro culture and preservation strategies requires the rapid use (<20 hours) of islets following isolation.

Another major challenge is that patients receiving transplanted islets from another individual are required to be on long-term systemic immune suppression drugs to help keep the cells alive and functioning after transplantation. Unfortunately, chronic immunosuppression has significant risks and side effects since it compromises the patient's natural defense and protection mechanisms.

Most importantly, the longevity and function of transplanted islets must be improved for patients to achieve long-term insulin independence. It has been estimated that the large majority of transplanted islets (>60%) fail to engraft following transplantation. This has been attributed to loss of critical microenvironmental cues, insufficient supply of oxygen and nutrients, and the rapid blood mediated inflammatory reaction following islet transplantation.

Such findings have focused current translational research efforts towards developing strategies that i) prolong or preserve viability and function of isolated islets and other insulin-producing cells in-vitro and ii) support long-term insulin-producing cell replacement and function without the need for chronic immunosuppression.

Therefore, there remains a need to develop an insulin-producing cell replacement strategy that i) facilitates minimally invasive procedures for administration, biopsy, and transplant removal; ii) supports non-invasive monitoring; and iii) promotes long-term engraftment and function of replacement insulin-producing cells in absence of systemic immunosuppression. An easy-to-administer, insulin-producing cell transplantation therapy that returns long-lasting blood glucose control back to the patient in the absence of systemic immunosuppression and fibrotic capsule formation has the potential to dramatically improve the quality of life, health status, and life expectancy for both human and veterinary patients with type 1 diabetes.

SUMMARY OF THE DISCLOSURE

In one aspect of the disclosure, compositions comprising collagen and insulin-producing cells in an aqueous medium are provided.

In another aspect of the disclosure, semi-solid collagen-insulin-producing cell compositions are provided.

In a further aspect of the disclosure, methods for treating metabolic disorders comprising administering compositions comprising collagen and insulin-producing cells to mammals are provided.

In an additional aspect of the disclosure, methods for treating metabolic disorders comprising administering semi-solid compositions comprising collagen and insulin-producing cells to mammals are provided.

In yet an additional aspect of the disclosure, methods for lowering blood glucose levels comprising administering compositions comprising collagen and insulin-producing cells to mammals are provided.

In a further aspect of the disclosure, methods for controlling blood glucose levels comprising administering compositions comprising collagen and insulin-producing cells to mammals are provided.

In yet an additional aspect of the disclosure, methods for lowering blood glucose levels comprising administering compositions comprising semi-solid compositions comprising collagen and insulin-producing cells to mammals are provided.

In a further aspect of the disclosure, methods for controlling blood glucose levels comprising administering semi-solid compositions comprising collagen and insulin-producing cells to mammals are provided.

In a still further aspect of the disclosure, processes for making semi-solid collagen-insulin-producing cell compositions are provided comprising combining an acidic collagen in an aqueous medium with a self-assembly reagent, and adding islets to make semisolid collagen-insulin-producing cell compositions.

In yet an additional aspect of the disclosure, processes for implanting a graft of collagen-insulin-producing cell compositions into mammals are provided.

In a further aspect of the disclosure, stable collagen-insulin-producing cell compositions are provided.

In an additional aspect of the disclosure, methods for reversing diabetes comprising administering a collagen-insulin-producing cell composition to a mammal are provided.

These and other features, aspects and advantages of the present invention will become better understood with reference to the following figures, associated descriptions and claims.

DETAILED DESCRIPTION

Figure 1:
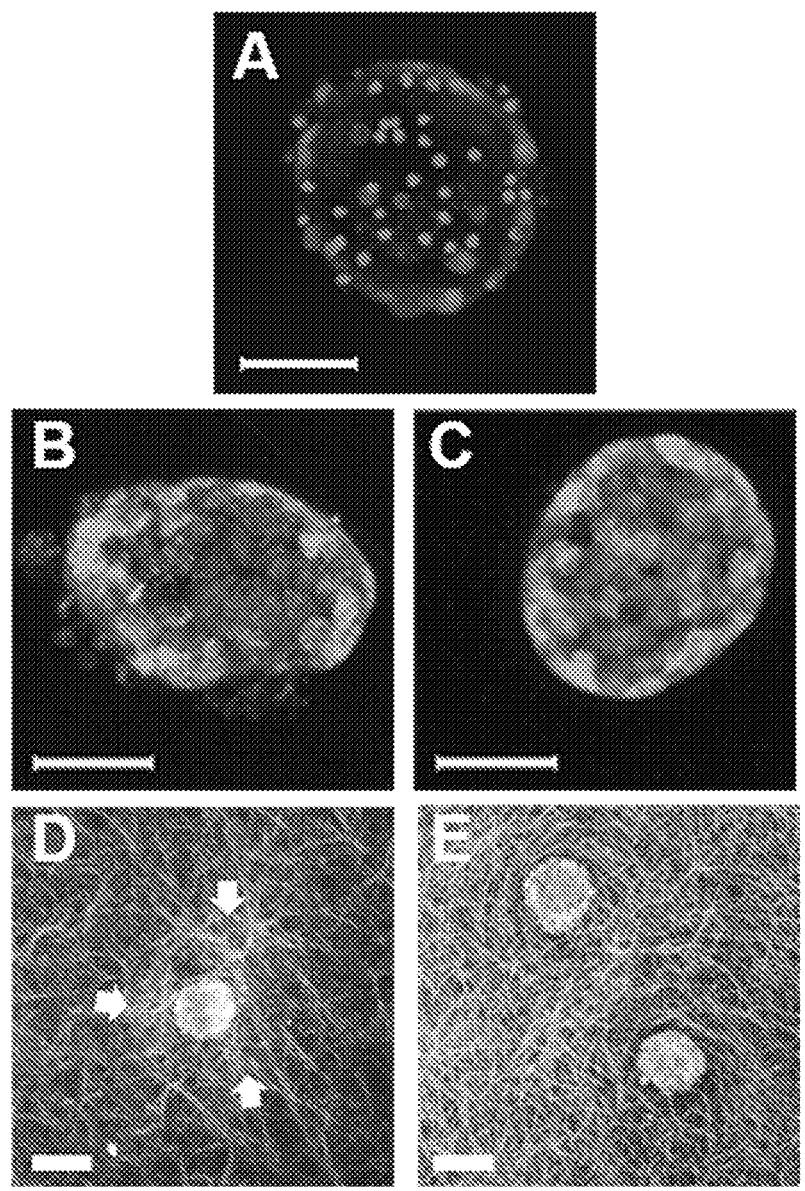
FIG. 1. Mouse islets macroencapsulated in polymerized collagen formulations show sustained viability and fibril density-dependent traction forces following 14 days of in-vitro culture. Representative images of calcein AM and propidium iodide stained islets after 14 days of culture in liquid media suspension (A), macroencapsulated in polymerized collagen-1.5 mg/mL (B), or macroencapsulated in polymerized collagen-3.0 mg/mL (C). Confocal reflection images show islet-induced collagen-fibril deformation (arrows) within polymerized collagen-1.5 mg/mL (D) but not polymerized collagen-3.0 mg/mL (E). Scale bar=50 μm (A-C) and 100 μm (D,E).

While the concepts of the present disclosure are illustrated and described in detail in the figures and the description herein, results in the figures and their description are to be considered as exemplary and not restrictive in character; it being understood that only the illustrative embodiments are shown and described and that all changes and modifications that come within the spirit of the disclosure are desired to be protected. Unless defined otherwise, the scientific and technology nomenclatures have the same meaning as commonly understood by a person in the ordinary skill in the art pertaining to this disclosure.

This disclosure includes innovative therapies for diabetes and glucose lowering and by creating collagen-fibril microenvironments for improved i) islet survival, function, and protection in vitro and during transport and ii) islet survival, function, protection, delivery, and engraftment in vivo. For example, the cytoarchitecture and function of mouse and human islets can be maintained in vitro beyond 14 days when encapsulated within collagen compositions of the disclosure. Further, mouse islets, either syngeneic or allogeneic, in a collagen-suspension injected subcutaneously self-assemble in vivo and maintain normoglycemia in an established diabetic mouse model. Transplanted islets maintained responsiveness to a glucose tolerance test as well as their characteristic multi-cellular morphology with no associated inflammatory response.

In many embodiments of the disclosure, compositions comprising collagen in an aqueous medium with insulin-producing cells are provided. The collagen is usually type-I collagen, and the type-I collagen is typically oligomeric collagen. The collagen medium is usually acidic and may be, for example, a solution or a suspension. The compositions are typically combined with a self-assembly reagent, often in an aqueous solution, which tends to neutralize the aqueous medium and enable self-assembly and polymerization. The self-assembly reagent may raise the pH to, for example, physiologic pH and/or physiologic ionic strength. The compositions are often in the form of an aqueous suspension and when the temperature is raised, such as to physiologic temperature, the rate of polymerization increases. Islets or other insulin-producing cells may be added to the neutralized collagen solution prior to polymerization. Polymerization may be induced in vitro or, for example, by injecting the compositions herein in vivo such as into a mammal. To slow polymerization, one may keep the compositions at less than 10° C. such as at about 4° C.

The self-assembly reagent may comprise one or more of a buffer, base, various salts and sugar (for example, glucose). A particular example of a self-assembly reagent can be found in Example 1.

The insulin-producing cells may be in the form of islets, such as pancreatic islets. When compared with the host mammal to which the compositions of the disclosure are administered, the islets may be autografts, allogeneic, or xenogeneic. Thus, for example, human or porcine islets could be used in a human patients with diabetes, representing allogeneic and xenogeneic transplants, respectively. As another example, canine or porcine islets could be used in a dog with diabetes, representing allogeneic and xenogeneic transplants, respectively. The islets may be derived from genetically modified animals. Typically, islets are taken from dogs, cats, porcine animals, or humans.

The insulin-producing cells, including beta cells, may be stem-cell derived insulin-producing cells, and these may be derived induced pluripotent stem cells, embryonic stem cells, or adult stem cells. The insulin-producing cells may be progenitor derived or genetically modified.

The stiffness of the polymerized collagen is related to the concentration of collagen in the composition. Typical concentrations of collagen range from about 0.5 mg/mL all the way up to about 40 mg/mL of liquid medium of the of the composition which is often a suspension. Other ranges include between about 0.5 mg/mL and about 30 mg/mL, between about 1 mg/mL and about 20 mg/mL, between about 1 mg/mL and about 10 mg/mL, between about 1 mg/mL and about 5 mg/mL, between about 1.5 mg/mL and about 5 mg/mL, between about 2 mg/mL and about 5 mg/mL, between about 2.2 mg/mL and about 4.2 mg/mL, between about 3.0 mg/mL and about 4.2 mg/mL. In many embodiments the concentration of oligomer is either about 3 mg/mL or about 4.2 mg/mL.

Once polymerized, the collagen-insulin-producing cell compositions of the disclosure typically become semi-solids. Such compositions may be called collagen-insulin-producing cell constructs or collagen-islet constructs when the insulin-producing cells are islets. For example, when suspensions or solutions of collagen-insulin-producing cells are injected in vivo, such as subcutaneously into a mammal, fibril networks of collagen form during the polymerization process which tend to encapsulate the insulin-producing cells. During the process, at least some and often substantially all of the collagen takes place in the formation of the fibril network. The composition which comprises the insulin-producing cells and the polymerized collagen (i.e., the fibril network) is a semi-solid in that it is not uniformly liquid or solid. Rather, it has both a solid phase (fibrils) and a liquid phase (aqueous within the body). The polymerized collagen is typically polymerized oligomeric collagen such as type I-oligomeric collagen.

The stiffness of the collagen compositions depends on the concentration. Various stiffness values of the compositions of the disclosure may be prepared. Such stiffness values typically range between about 40 Pa and about 2 MPa. Other ranges include between about 100 Pa and about 1 MPa, between about 200 Pa and about 1 MPa, between about 300 Pa and about 500 KPa, between about 500 Pa and about 100 KPa, between about 500 Pa and about 5 KPa, between about 800 Pa and about 3 KPa, between about 900 Pa and about 2.5 KPa, and between about 1 KPa and about 2 KPa. Specific embodiments include about 1 KPa or about 2 KPa.

Unlike islet suspensions of the prior art, the insulin-producing cells of the disclosure, such as pancreatic islets, when present in the compositions of the disclosure, are able to be sustained for over 14 days in vitro due to the protective nature of the collagen fibril network surrounding the cells. For example, FIG. 1 shows compositions of the disclosure made in accordance with Example 2. Mouse islets were combined with acidic stock collagen solutions made in accordance with Example 1 and polymerized with the self-assembly reagent of Example 1. The compositions so polymerized were evaluated after 14 days in a cultured medium and compared with islets which were simply suspended in a liquid medium. As shown in FIG. 1A, such islets died, whereas islets encapsulated in accordance with compositions of the disclosure survived, for example, as set forth in FIG. 1B and FIG. 1C.

When formed in a mammal, such as after subcutaneous injection, or after implantation, the insulin-producing cells in the collagen compositions of the disclosure are sustainable for well beyond 14 days such as for over 90 days. In addition, the compositions, when placed in vivo, do not trigger a foreign body response. Such a response would evidence itself by infiltrating inflammatory cell populations, such as neutrophils and macrophages, as well as formation of an obvious fibrous capsule around the fibrillar network, and histology shows no evidence of such inflammatory cell populations or fibrous capsule formation. Indeed, histology shows the integration of the compositions of the disclosure via vascularization of surrounding tissue in vivo. Further, if there were a foreign body response, the islets would cease to function and, as the Examples herein and figures show, the contrary occurs—the islets survive and the islets continue to produce insulin to maintain normal blood glucose levels.

When placed in a mammal, the compositions of the disclosure are capable of lowering blood glucose levels to below the diabetic threshold on a mammalian species basis. Indeed, the compositions may be used to maintain normoglycemia. The compositions may also be used to treat metabolic disorder such as type 1 diabetes and indeed have been shown to reverse diabetes within 24 hours of administration as seen in Example 5 and FIG. 12.

The compositions of the disclosure may further comprise an active pharmaceutical ingredient, such as an immunosuppressive agent. Examples of immunosuppressive agents include mycophenolic acid, mycophenolate mofetil, or a combination thereof. Compositions containing such agents may be dosed to a mammal in order to treat metabolic conditions for example. The compositions of the disclosure may further comprise non-islet cells. Examples of such cells include endothelial colony-forming cells. Such endothelial colony-forming cells may be, for example, human endothelial colony-forming cells. Such endothelial colony-forming cells may be vessel-forming.

In other embodiments of the disclosure, collagen-solutions may be combined with islets to form suspensions that are injected in preclinical diabetic allogenic and syngeneic mouse models. For example, 500 islets, separated into 2 sites, were mixed with collagen solutions at different concentrations (3.2 mg/mL, 2.2 mg/mL, or 1.4 mg/mL which corresponds to 1000 Pa, 500 Pa, or 200 Pa, respectively) or saline and then injected into the subcutaneous space of mice. In an allogenic (C57BL/6J to NOD-SCID) model, mice that had collagen-islet constructs of the disclosure with a higher collagen concentration consistently lowered and maintained normoglycemia (<300 mg/dL) for 14 days after transplantation. Control mice that received islets mixed with saline remained hyperglycemic over the study period (>250 mg/dL). Further testing of 1000 Pa collagen-islet construct in a syngeneic (C57BL/6J to C57BL/6J) model indicates that the mice lowered and maintained normoglycemia for more than 90 days (see FIG. 9A). Histological analysis showed mature vasculature near transplanted islets and no evidence of a foreign body response to the collagen-islet construct. Immunofluorescence indicated viable islets that positively stained for insulin and glucagon.

Figure 15:
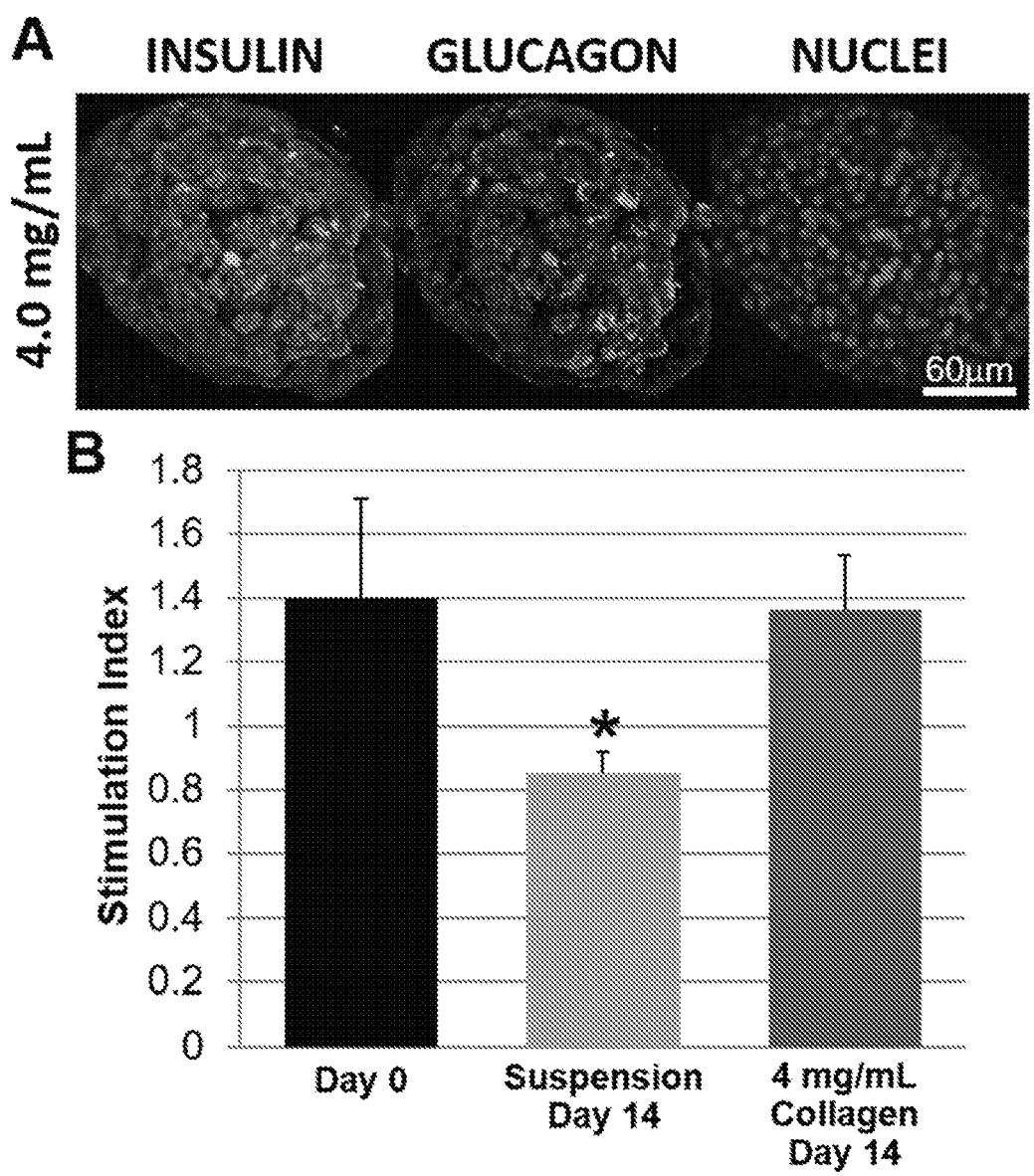
FIG. 15. Human islets macroencapsulated in polymerized collagen show preserved morphology and function following 14-day in-vitro culture. A. Immunostaining shows islet cytoarchitecture with insulin- and glucagon-positive cells within polymerized collagen-4.0 mg/mL. Islet cell nuclei were visualized with DRAQ5™. Scale bar=60 µm. B. Stimulation index (mean±SE) as measured by glucose-stimulated insulin release for untreated control islets (day 0; n=8), 14-day suspension islets (n=9), and 14-day polymerized collagen-islet constructs (4.0 mg/ml; n=8). Asterisk indicates that the mean stimulation index value for 14-day suspension islets was significantly less than values for other two groups ($p<0.05$).
Figure 16:
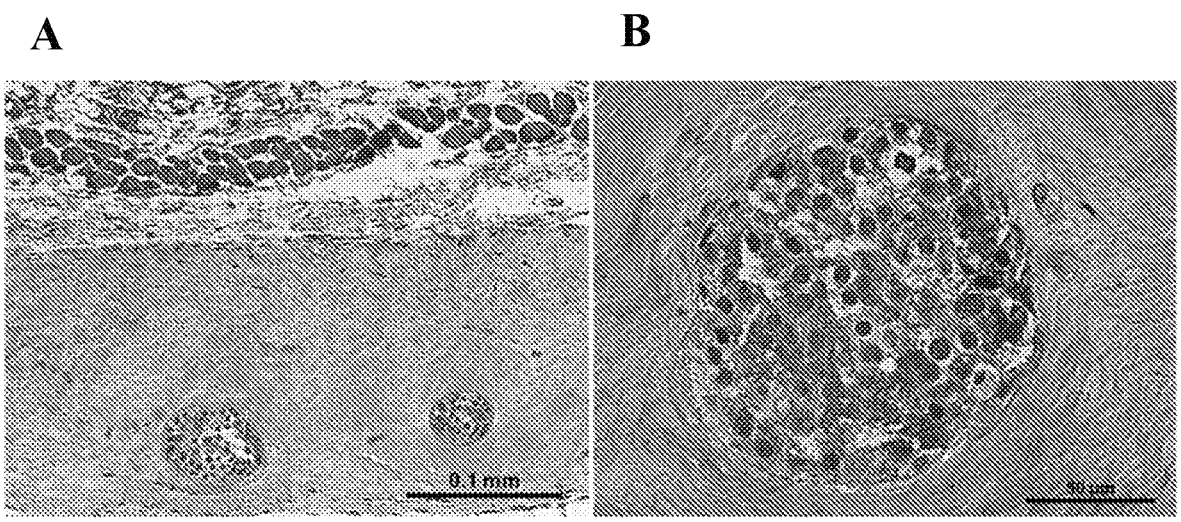
FIG. 16. Histopathological analysis of human islet explants 9 days following subcutaneous transplantation in diabetic C57BL/6J mice (xenogenic model). Islets delivered and encapsulated within polymerizable collagen (2000 Pa) maintained their multicellular cytoarchitecture (A-B). There was no evidence of acute inflammation or foreign body response associated with the islets or polymerized collagen material.

In other embodiments, human islets may be used to make collagen-islet construct of the disclosure as, for example, set forth in Example 6. Such constructs have been shown to be stable in vitro as seen in Example 6 and FIG. 15. Human islets in collagen-islet constructs of the disclosure have been transplanted into diabetic mice without a foreign body response, thus showing the xenogeneic robustness of compositions of the disclosure, as seen in Example 7. Example 8 is directed collagen-insulin-producing cell compositions of the disclosure, such as collagen-islet constructs, may also be combined with one or more of the accessory cells or active pharmaceutical ingredients.

Further, collagen-insulin-producing cell compositions of the disclosure can be readily injected into a well plate to polymerize and create polymerized collagen-encapsulated insulin-producing-cell constructs for long-term maintenance of cell morphology and function in vitro. Such compositions may also be injected subcutaneously in vivo for management of type 1 diabetes. In many embodiments, the insulin-producing cells are islets.

Collagen encapsulation and delivery of insulin-producing cells such as islets have several advantages over conventional and emerging therapeutic strategies, including: 1) low cost encapsulation biomaterial; 2) biomaterial elicits no foreign body response; 3) biomaterial induces rapid neovascularization, innervation, and tissue integration which supports islet longevity and function; 4) therapeutic insulin-producing cells such as islets provide superior physiologic blood glucose monitoring and maintenance; 5) supports local delivery of any necessary immunomodulation agents; 6) may provide complete insulin independence; 7) may eliminate or reduce the need for long-term immunosuppression.

EXAMPLES

Example 1. Preparation and Induction of Polymerization (Self-Assembly) of Collagen Compositions Type I oligomeric collagen was either isolated from porcine dermis according to the procedure outlined in Example 1 of U.S. Pat. No. 8,084,055 or obtained in a proprietary sterile formulation from GeniPhys, LLC as medical grade, which were prepared following the general procedures set forth below.

Type I collagen oligomers are derived from the dermis of closed herd pigs and prepared as described previously (Bailey J L, Critser P J, Whittington C, Kuske J L, Yoder M C, Voytik-Harbin S L; Collagen oligomers modulate physical and biological properties of three-dimensional self-assembled matrices, *Biopolymers* (2011) 95(2):77-93 and Kreger S T, Bell B J, Bailey J, Stites E, Kuske J, Waisner B, Voytik-Harbin S L; Polymerization and matrix physical properties as important design considerations for soluble collagen formulations, *Biopolymers* (2010) 93(8):690-707, both incorporated herein by reference). Prior to use, lyophilized type I oligomeric collagen was dissolved in 0.01 N hydrochloric acid to form an acidic collagen solution. The acidic collagen solution was then rendered aseptic by filtration or treatment with chloroform. A Sirius Red (Direct Red 80) assay is used to determine collagen concentration. Oligomer formulations are standardized based upon purity as well as polymerization capacity according to the ASTM international consensus standard F3089-14 (ASTM Standard F3089, 2014, "Standard Guide for Characterization and Standardization of Polymerizable Collagen-Based Products and Associated Collagen-Cell Interactions", ASTM International, West Conshohocken, PA, F3089-14, www.astm.org. Polymerization capacity is defined by matrix shear storage modulus (G') as a function of collagen concentration of the polymerization reaction. Single-step self-assembly was performed with a 10× self-assembly reagent prepared according to the following recipe:

2 g $KH_2PO_4$ (FW 136.09)
30 11.5 g $Na_2HPO_4$ (FW 141.96)
2 g KCl (FW 74.55)
10 g glucose
80 g NaCl (FW 58.44) 20 ml 5N NaOH All reagents are added to Milli-Q filtered water to achieve a finalized volume of liter and sterile filtered (0.22 μm). One part 10× self-assembly reagent is then added to 9 parts acidic collagen solution, which initiates polymerization. In each example below collagen-islet encapsulations were done with oligomer.

Example 2. Mouse Islets Show Improved Viability, Cytoarchitecture, and Function in-Vitro Following Creation of Polymerized Collagen-Islet Constructs Loss of critical microenvironmental cues upon islet isolation and culture decreases islet viability and function, thereby compromising islet engraftment and transplant outcome. By comparison, polymerizable collagen can improve survival and function of mouse islets in vitro. Polymerized collagen-islet constructs were created and cultured for periods of time up to 14 days and additional mouse islets were cultured using the conventional liquid suspension format (see e.g., Methods of Human Islet Culture for Transplantation. Murdoch T B, McGhee-Wilson D, Shapiro A M J, Lakey J R T. *Cell Transplant*. 2004 September; 13(6):605-618) for comparison with the results herein indicating improvements due to the collagen-islet constructs of the disclosure.

Mouse Islets.

Mouse pancreatic islets were isolated from 8- to 14-wk old C57BL/6J mice (Jackson Laboratory, Bar Harbor, ME) according to established methods. Islet isolations were approved by the Indiana University Institutional Animal Care and Use Committee using AALAC guidelines. Isolated islets were cultured suspended in liquid culture medium consisting of RPMI 1640 medium supplemented with 10% fetal bovine serum (HyClone, ThermoFisher Scientific, Waltham, MA), 100 U/mL penicillin, and 100 μg/mL streptomycin (Sigma Aldrich, St. Louis, MO) in a humidified environment of 5% $CO_2$ in air at 37° C. prior to experimental use the next day.

Collagen Encapsulation of Mouse Islets for In-Vitro Culture.

To prepare polymerized collagen matrices at different stiffness (G') values, stock acidic collagen solutions of Example 1 were diluted with 0.01 N HCl so to achieve final collagen concentrations of 0.5-5 mg/mL in the polymerization reaction. These polymerization reaction concentrations yield polymerized matrices with shear storage modulus (G', Pa; also referred to generally as stiffness) from about 40 to about 2500 Pa, as defined by the collagen's polymerization capacity. The polymerization reaction was initiated by adding 10× self-assembly solution of Example 1 to the acidic collagen solution (9 parts acidic collagen solution plus 1 part 10× self-assembly solution of Example 1), which neutralizes the) to form a neutralized collagen solution. Mouse islets were suspended in the neutralized collagen solution, aliquoted into 96 well-plates (30 islets/100 μL; Cellvis, Sunnyvale, CA). The neutralized collagen solutions (in the presence or absence of cells) were maintained on ice (4° C.) prior to warming to 37° C., which induce rapid polymerization. Immediately following polymerization, culture medium (RPMI 1640 medium supplemented with 10% fetal bovine serum (HyClone, ThermoFisher Scientific, Waltham, MA), 100 U/mL penicillin, and 100 μg/mL streptomycin (Sigma Aldrich, St. Louis, MO)) was added, and the collagen-islet constructs were cultured for up to 14 days with medium changes made daily. For comparison purposes, mouse islets were also cultured in a conventional suspension format in liquid medium.

Assessment of Islet Viability and Function Following In-Vitro Culture.

Islets cultured suspended in either conventional liquid media or as polymerized collagen-islet constructs of the disclosure were treated with Calcein AM and propidium iodide (Molecular Probes, Eugene, OR) for live-dead determinations. Images were collected using laser scanning confocal microscopy on an Olympus IX81 inverted microscope adapted with Olympus Fluoview FV1000 (Olympus, Tokyo, Japan). Image stacks of 40-100 μm thickness with a 3 μm step size were obtained using a 20× air objective, and z-projections were created using Imaris software (Bitplane, Concord, MA).

Immunofluorescence was used to qualitatively assess islet cytoarchitecture and protein expression. Islets cultured suspended in liquid or as polymerized collagen-islet constructs were fixed in 3% paraformaldehyde (Mallinckrodt, Derbyshire, UK), permeabilized with 0.1% Triton X-100 (Sigma Aldrich), and blocked with 1% bovine serum albumin (Jackson ImmunoResearch, West Grove, PA). Samples then were treated overnight at 4° C. with primary guinea pig anti-insulin (PA1-26938, Invitrogen) and rabbit anti-glucagon antibodies (mouse islets: ab10988, Abcam, Cambridge, MA; human islets: 2760, Cell Signaling Technologies, Danvers, MA). Samples were rinsed and then treated with secondary antibodies (A11073, goat anti-guinea pig Alexa Fluor 488 conjugate and A11035, goat anti-rabbit Alexa Fluor 546 conjugate, Life Technologies) overnight at 4° C. After rinsing, samples were treated with DRAQ5™ (Cell Signaling Technologies, Danvers, MA) to stain nuclei.

Quantitative assessment of islet function was performed via glucose stimulated insulin secretion (GSIS) testing. Islets cultured suspended in liquid or as polymerized collagen-islet constructs were prepared within 24-well Transwell culture inserts (Corning, Kennebunk, ME) for up to 14 days. Basal insulin secretion was stimulated by incubating the samples for 1 hour with 2.8 mM glucose in Krebs Ringer buffer (0.1% BSA, 25 mM HEPES, 115 mM NaCl, 24 mM $NaHCO_3$, 5 mM KCl, 1 mM $MgCl_2 \cdot 6H_2O$, 2.5 mM $CaCl_2 \cdot 2H_2O$). Following basal secretion, samples underwent static incubation for 1 hour each, with low (2.8 mM) followed by high (28 mM) glucose concentrations in Krebs Ringer buffer. Insulin secretion was measured using a STEL-LUX® insulin enzyme-linked immunosorbent assay (ELISA) kit (Alpco, Salem, NH). Stimulation indices, which represent the ratio of insulin secreted with high glucose over insulin secreted with low glucose, were calculated and normalized to values obtained for freshly isolated (day 0) islets.

Summary of Findings.

Figure 2:
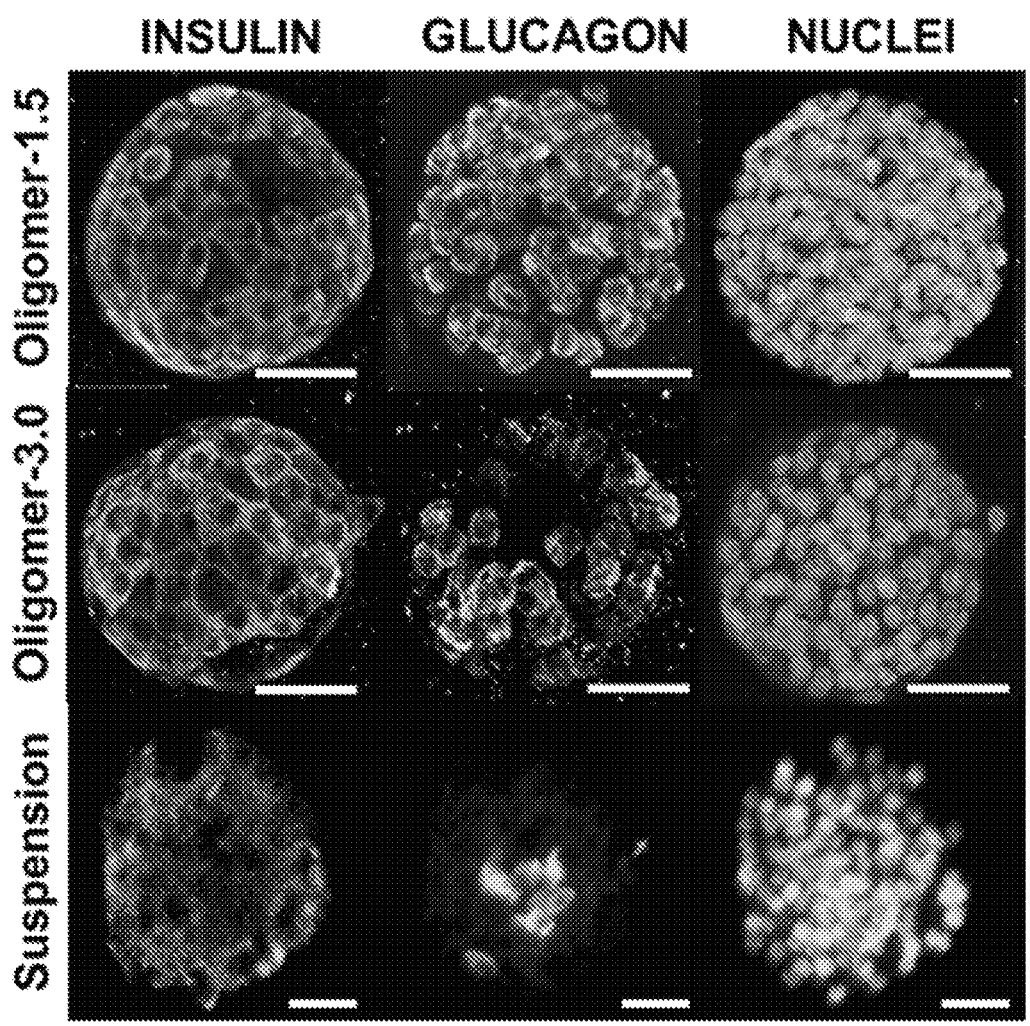
FIG. 2. Mouse islets macroencapsulated in polymerized collagen formulations maintain multicellular cytoarchitecture following 14 days of in-vitro culture A, Immunostaining shows islet cytoarchitecture with insulin- and glucagon-positive cells within polymerized collagen-1.5 mg/mL and polymerized collagen-3.0 mg/mL. By comparison, liquid media suspensions of islets show compromised insulin and glucagon staining patterns. Islet cell nuclei were visualized with DRAQ5™. Scale bar=30 μm.
Figure 3:
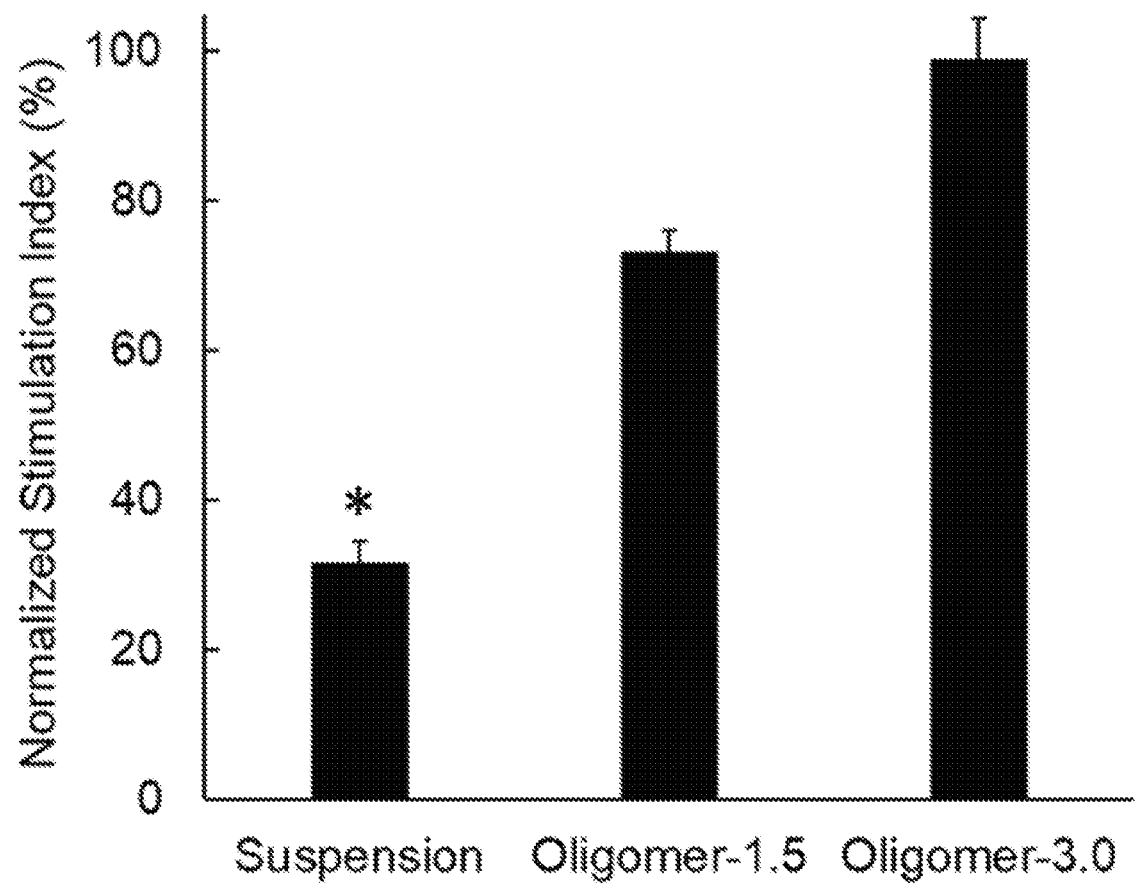
FIG. 3. Mouse islets macroencapsulated in polymerized collagen formulations maintain function following 14 days of in-vitro culture. Fourteen-day normalized stimulation indices (mean±SD; n=8-12) as measured by glucose-stimulated insulin release. Values were normalized to stimulation indices for freshly isolated (day 0) islets. Asterisk indicates mean stimulation index value for 14-day suspension islets was significantly less than the value for freshly isolated islets ($p<0.05$).

Islets cultured suspended in liquid medium exhibited a significant loss of viability, with the majority of islet cells showing moderate to significant islet death over the 14-day culture period (FIG. 1A). Suspension islets also displayed compromised insulin and glucagon staining patterns (FIG. 2) and a significant ($p<0.05$) decrease in function over time, as measured by GSIS (FIG. 3). In contrast, islets encapsulated and cultured within polymerized collagen of the disclosure prepared at 1.5 mg/mL and 3.0 mg/mL maintained their viability (FIG. 1B-C), their multi-cellular architecture with insulin- and glucagon-producing cells (FIG. 2), and glucose-sensitive insulin secretion function (FIG. 3) over the 14-day culture period. The ability of islet cells to bind to and exert contractile forces on the surrounding collagen-fibril matrix was evident at both macroscopic (construct contraction) and microscopic (islet-collagen fibril interactions) levels (FIG. 1D-E). Although these islet-collagen interactions resulted in contraction of the majority of 0.5 mg/mL constructs, 1.5 mg/mL and 3.0 mg/mL constructs retained their volume and showed progressively less cell-induced local fibril reorganization with increased concentration (FIG. 1D-E).

Example 3. Subcutaneous Transplantation of Islets in Diabetic Mice: Short-Term Study Using Allogeneic Model Since encapsulation of mouse islets within polymerized collagen constructs prolonged their viability and function in-vitro, various polymerizable collagen formulations were prepared by mixing islets with neutralized collagen solutions to create collagen-islet suspensions, followed by subcutaneous injection of the collagen-islet suspension into streptozocin-induced diabetic mice. Immediately following injection, the collagen-islet suspension polymerized in situ, forming a stable and continuous collagen-fibril matrix that encapsulated and protected resident islets within the subcutaneous space. Allogeneic C57BL/6J mouse islets were injected into NOD.CB17-Prkdc$^{scid}$/J mice, which exhibit inflammatory but not immune reactions mediated by T cells and B cells. Function of subcutaneously transplanted islets as well as the biocompatibility and tissue response of the polymerized collagen biomaterial were evaluated after 14 days and showed positive effects compared to control animals that received injections of polymerized collagen or islets only (suspended in saline).

Mouse Islets.

Mouse pancreatic islets were isolated from 8- to 14-wk old C57BL/6J mice (Jackson Laboratory, Bar Harbor, ME) according to methods of Stull and coworkers. Islet isolations were approved by the Indiana University Institutional Animal Care and Use Committee using AALAC guidelines. Isolated islets were incubated in RPMI 1640 medium supplemented with 10% fetal bovine serum (HyClone, ThermoFisher Scientific, Waltham, MA), 100 U/mL penicillin, and 100 μg/mL streptomycin (Sigma Aldrich, St. Louis, MO) in a humidified environment of 5% $CO_2$ in air at 37° C. prior to experimental use the next day.

Subcutaneous Islet Transplantation in Diabetic Mice (Allogeneic Models).

Mouse islet transplantation procedures were approved by the Indiana University Institutional Animal Care and Use Committee using AALAC guidelines. Male 8-wk to 14-wk old NOD.CB17-Prkdc$^{scid}$/J (allogeneic model; Jackson Laboratories, Bar Harbor, ME) recipient mice were injected with low dose streptozotocin (55 mg/kg) for 5 days to chemically induce diabetes prior to islet transplantation. C57BL/6J islets were mixed with neutralized collagen solutions. Collagen-islet suspensions were then injected subcutaneously through small bore needles (26½G) into diabetic mice. Each mouse received 2 injections, one positioned laterally on each side of the back, with approximately 250 islets/500 μL collagen (oligomer) solution neutralized with the self-assembly reagent of Example 1 per site for a total of 500 islets/mouse. Additional mice received 2 injections of islets suspended in saline (islets only; 250 islets/500 μL saline/site) or neutralized collagen solution (collagen only: 500 μL collagen/site) for comparison. Non-fasting blood glucose was measured 3 times per week after transplantation. Diabetes was classified as two consecutive blood glucose levels above 250 mg/dL.

Intraperitoneal Glucose Tolerance Test.

Intraperitoneal glucose tolerance tests (GTT) were performed at specified times following subcutaneous transplantation to assess islet responsiveness to glucose challenges. Mice were fasted overnight, and then injected intraperitoneal with 2 g/kg of 20% glucose. Blood glucose levels were measured at baseline before injection (time 0) and 15, 30, 60, 90, and 120 minutes following glucose injection.
In-Vivo Histology and Immunofluorescence.

Injection sites and surrounding tissues were removed at specified timepoints and placed in 10% formalin before paraffin embedding and sectioning. Sections were stained with hematoxylin and eosin (H&E) and Masson's trichrome (MTC). For immunofluorescence, sections were deparaffinized, rehydrated, and stained with primary guinea pig anti-insulin (A0564, Dako, Santa Clara, CA) and rabbit anti-glucagon (sc-13091, Santa Cruz Biotechnology, Dallas, TX) at 1:500 dilutions. Sections were then treated with secondary Alexa Fluor 488 goat anti-guinea pig (A11073, Life Technologies) and Alexa Fluor 568 goat anti-rabbit (A11036, Life Technologies) at 1:50 and 1:200 dilutions, respectively. For identification of vascular endothelium, sections were stained with primary mouse anti-CD31/PE-CAM-1 (BBA7, R&D Systems, Minneapolis, MN) then treated with secondary Alexa Fluor 546 donkey anti-mouse (A10036, Life Technologies). Nuclei were counterstained with DRAQ5™ or DAPI.
Summary of Results.

Figure 4:
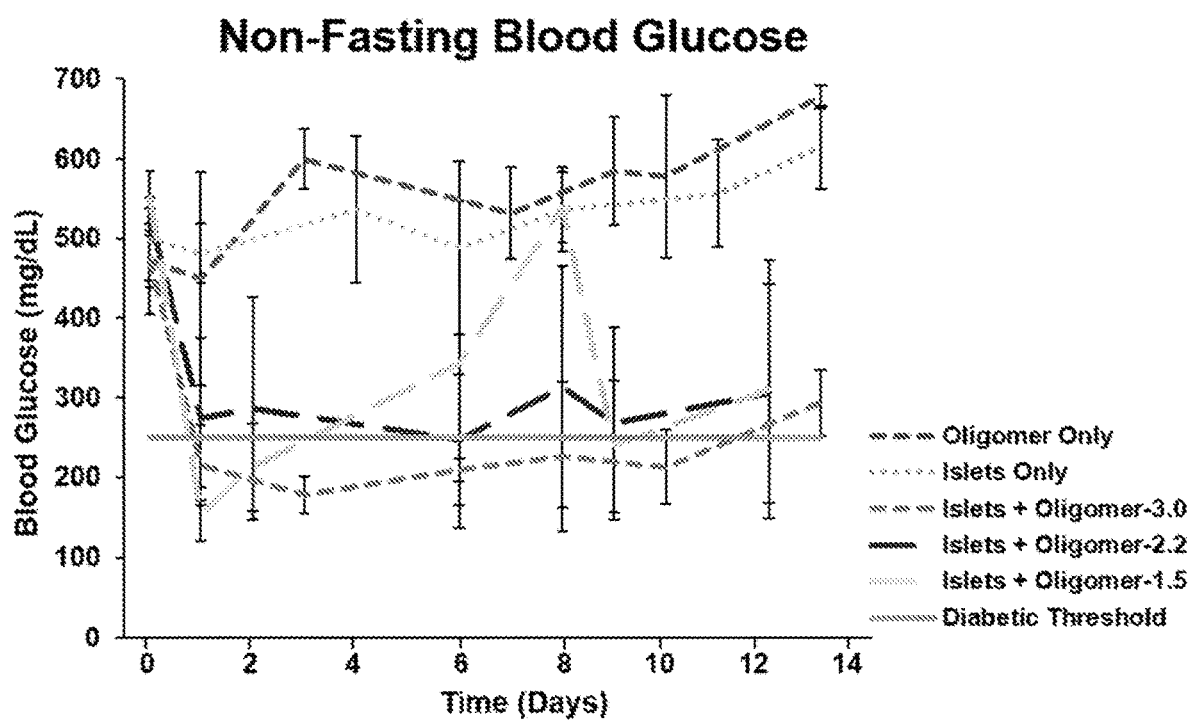
FIG. 4. Non-fasting blood glucose levels (mean±SD) following subcutaneous injection and in-situ macroencapsulation of C57BL/6J islets in various polymerized collagen formulations (n=3 for each formulation) within diabetic immunocompromised NOD.SCID mice as compared to subcutaneous injection of islets only (n=4) and polymerized collagen only (n=3) control groups.
Figure 5:
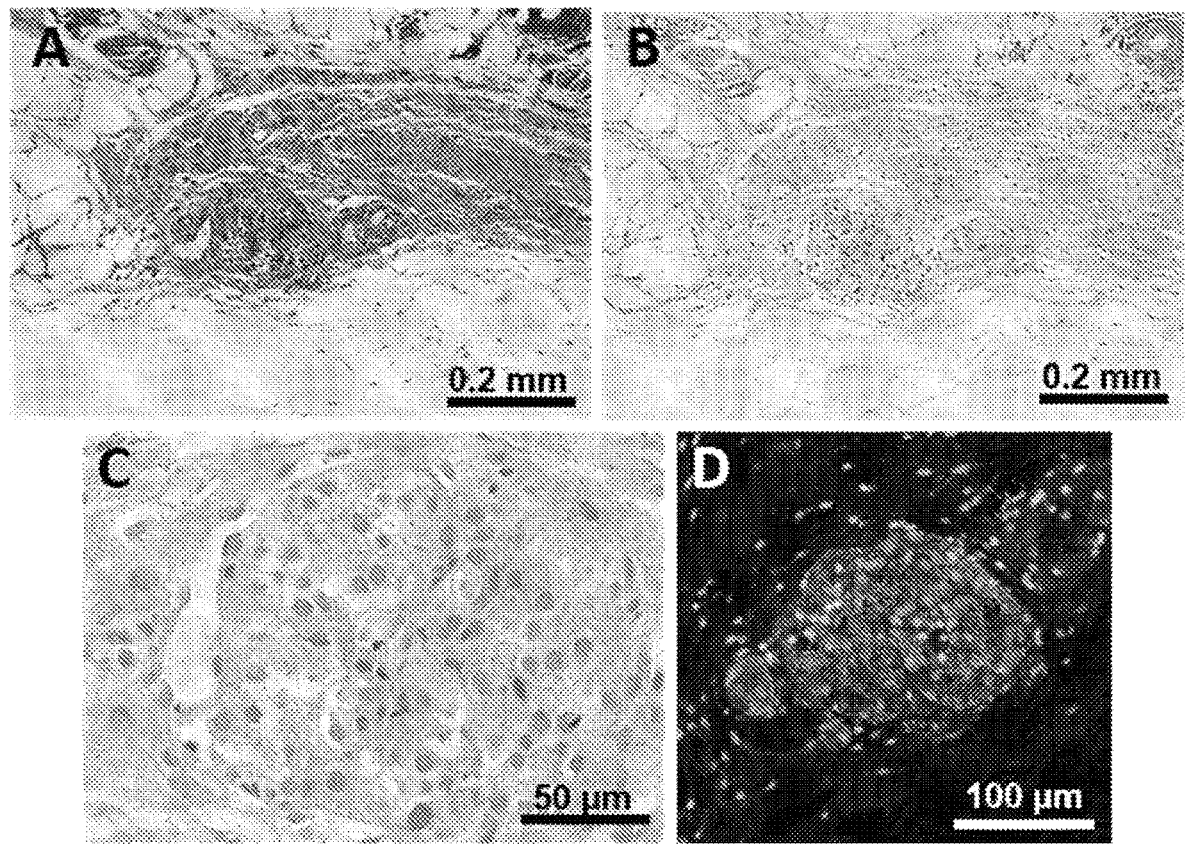
FIG. 5. Histopathological and immunohistochemical analysis of C57BL/6J islet explants in polymerized collagen-1.5 mg/mL (A-D) 14 days following subcutaneous transplantation in diabetic immunocompromised NOD.SCID mice. Polymerized collagen-islet constructs were readily identifiable between the panniculus carnosus muscle and the skeletal muscle facial layers. Masson's trichrome (A) and H&E (B) stained sections indicated functional vascularization of islets and no evidence of polymerized fibrillar collagen degradation, inflammation, or foreign body response. Islets maintained multicellular cytoarchitecture with cells staining positively for insulin and glucagon (D). Cell nuclei were stained with DAPI (2-(4 Amidinophenyl)-1H-indole-6-carboxamidine).
Figure 6:
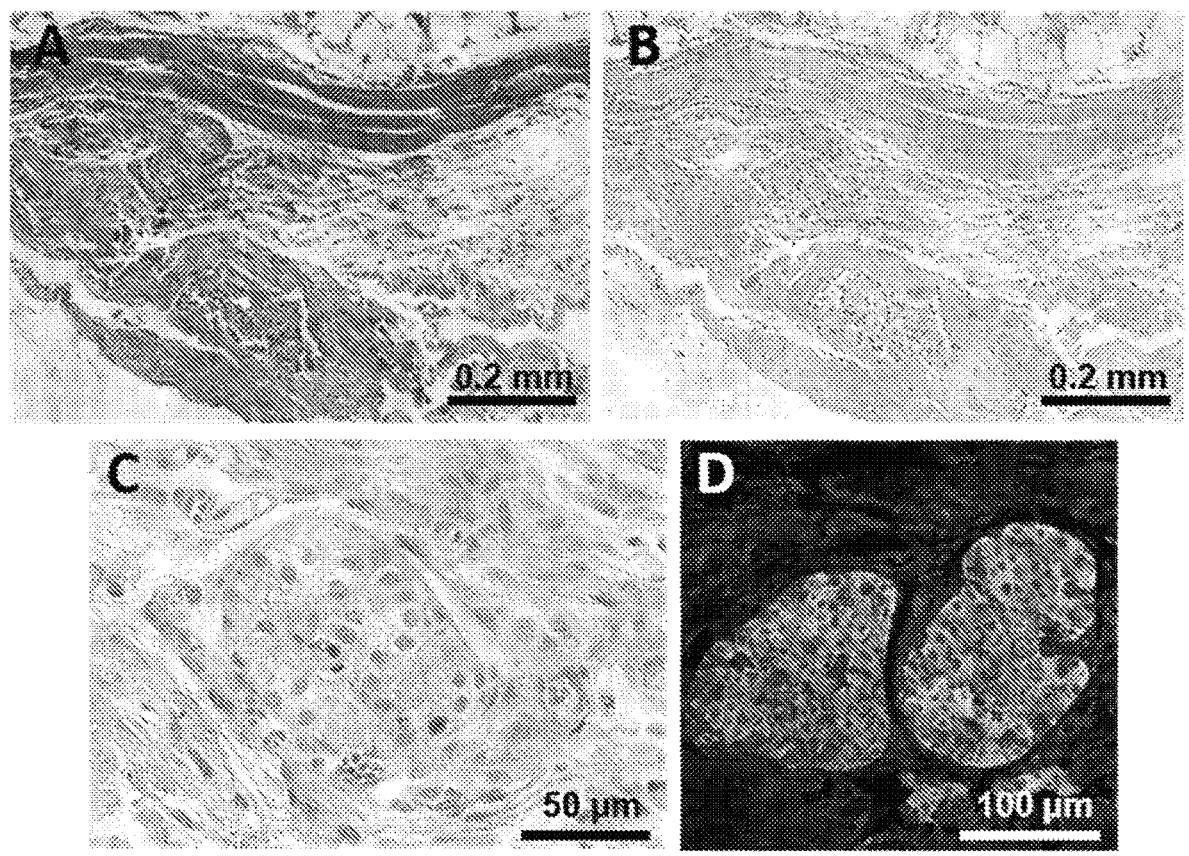
FIG. 6. Histopathological and immunohistochemical analysis of C57BL/6J islet explants in polymerized collagen-2.2 mg/mL (A-D) 14 days following subcutaneous transplantation in diabetic immunocompromised NOD.SCID mice. Polymerized collagen-islet constructs were readily identifiable between the panniculus carnosus muscle and the skeletal muscle facial layers. Masson's trichrome (A) and H&E (B) stained sections indicated functional vascularization of islets and no evidence of polymerized fibrillar collagen degradation, inflammation, or foreign body response. Islets maintained multicellular cytoarchitecture with cells staining positively for insulin and glucagon (D). Cell nuclei were stained with DAPI.
Figure 7:
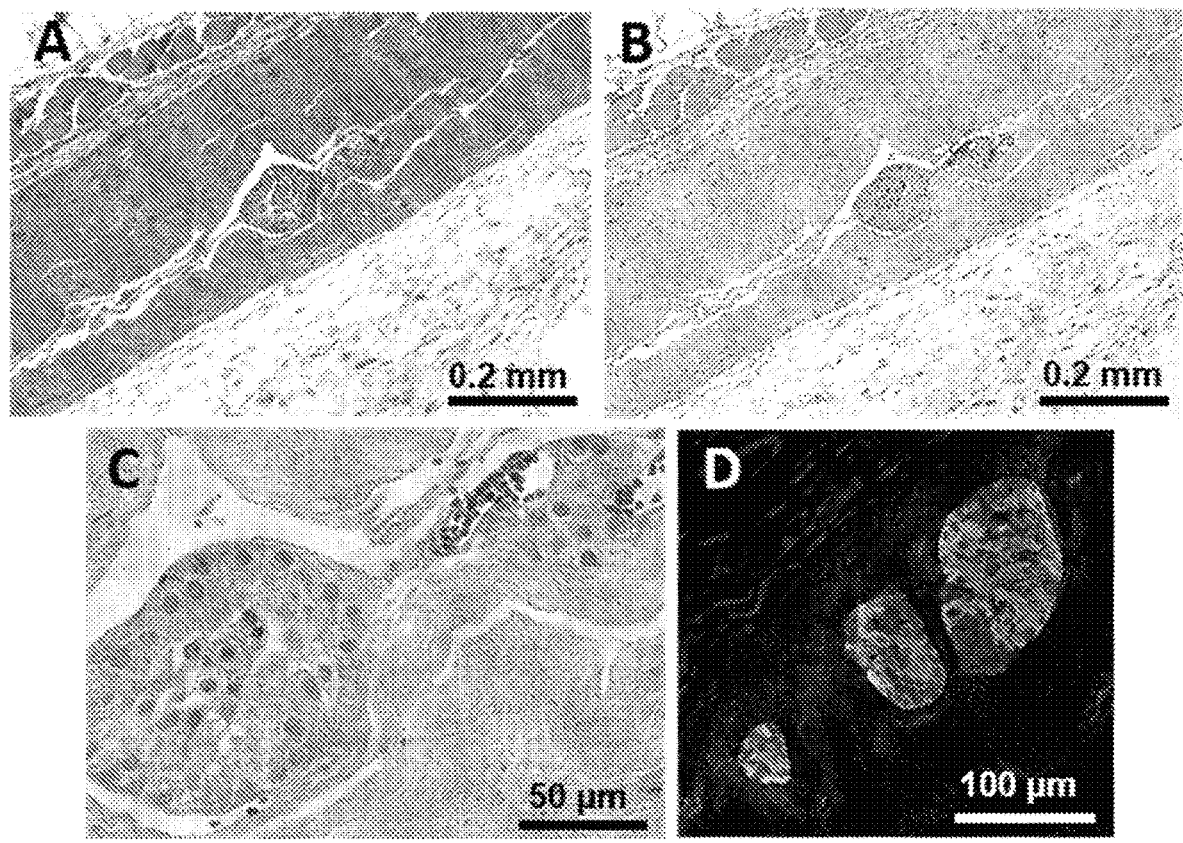
FIG. 7. Histopathological and immunohistochemical analysis of C57BL/6J islet explants in polymerized collagen-3.0 mg/mL (A-D) 14 days following subcutaneous transplantation in diabetic immunocompromised NOD.SCID mice. Polymerized collagen-islet constructs were readily identifiable between the panniculus carnosus muscle and the skeletal muscle facial layers. Masson's trichrome (A) and H&E (B) stained sections indicated functional vascularization of islets and no evidence of polymerized fibrillar collagen degradation, inflammation, or foreign body response. Islets maintained multicellular cytoarchitecture with cells staining positively for insulin and glucagon (D). Cell nuclei were stained with DAPI.
Figure 8:
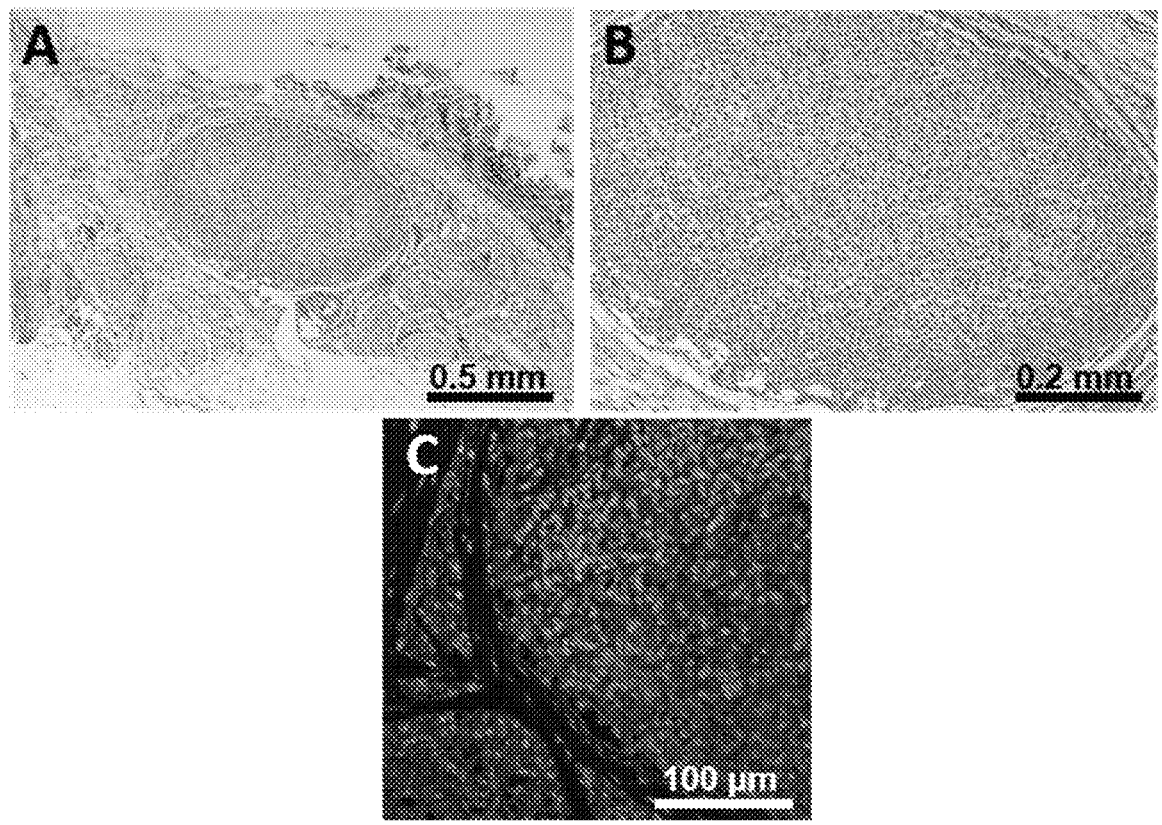
FIG. 8. Histopathological and immunohistochemical analysis of C57BL/6J islet-only explants (A-D) 14 days following subcutaneous transplantation in diabetic immunocompromised NOD.SCID mice. H&E stained sections (A-B) and immunohistochemical staining for insulin and glucagon (C) showed injection of islets in saline resulted in formation of a large granuloma with loss of normal multicellular morphology and protein expression.

Initial pilot studies evaluated collagen solutions at various concentrations of 1.5, 2.2, and 3.0 mg/ml which correspond roughly to polymerized collagen matrix stiffness values 200, 500, and 1000 Pa respectively based upon standardized polymerization capacity. The polymerization half-time for the collagen at body temperature (37° C.) was 20.26±0.12 seconds, 16.28±0.03 seconds, and 16.35±0.11 seconds, as measured rheometrically for collagen solutions at 1.5, 2.2, and 3.0 mg/mL, respectively. Prior to islet transplant, mean blood glucose values for the animals were 533±72 mg/dL. As shown in FIG. 4, collagen 1000 Pa+islets ("Islets and Oligomer 3.0 in FIG. 4") provided the most reproducible reversal of diabetes in all animals (consistent maintenance of blood glucose values below the diabetic threshold) and as well as highly regulated blood glucose levels (small standard deviation bars). For the collagen 1000 Pa+islet group, non-fasting blood glucose decreased below the diabetic level within 24 hours and remained below the diabetic level for the entire 14 day study period (FIG. 4). In contrast, both islet only and collagen 1000 Pa only control groups remained hyperglycemic, above the diabetic level, for the entire 14-day study (FIG. 4). Comparing histopathological results of FIGS. 5, 6, and 7, the most uniform encapsulation of individual islets was achieved with 1000 Pa (3 mg/mL) collagen, with islets maintaining their normal morphology with evidence of functional revascularization (FIG. 7). Islet aggregates were noted within 500 Pa (1.5 mg/mL)+islet and 200 Pa (2.2 mg/mL)+islet groups, suggestive of insufficient fibril density for encapsulation and/or inadequate mixing. Immunostaining of all polymerized collagen+islet groups confirmed a multicellular cytoarchitecture with both insulin- and glucagon-producing cells (FIGS. 5D, 6D, and 7D). The collagen material, which polymerized in situ following injection, appeared as normal collagenous connective tissue with moderate fibroblast infiltration and no evidence of inflammation or foreign body response (FIG. 5). The fibrillar collagen material was highly stable and well-integrated within the subcutaneous space for all collagen+islet (FIGS. 5-7) and collagen only groups. In contrast, for the islet only group, large granulomatous regions were observed with no identifiable islets (FIG. 8). Such findings are consistent with previous reports that suggest that the subcutaneous space is an inhospitable microenvironment for transplantation of islets alone.

Example 4. Subcutaneous Transplantation of Islets in Diabetic Mice: Long-Term Study Using Syngeneic Model To assess long-term survival and function of collagen-encapsulated islets following subcutaneous delivery, C57BL/6J mouse islets were injected into C57BL/6J mice (syngeneic transplant).
Mouse Islets.

Mouse pancreatic islets were isolated from 8- to 14-wk old C57BL/6J mice (Jackson Laboratory, Bar Harbor, ME) according to methods of Stull and coworkers. Islet isolations were approved by the Indiana University Institutional Animal Care and Use Committee using AALAC guidelines. Isolated islets were incubated in RPMI 1640 medium supplemented with 10% fetal bovine serum (HyClone, ThermoFisher Scientific, Waltham, MA), 100 U/mL penicillin, and 100 µg/mL streptomycin (Sigma Aldrich, St. Louis, MO) in a humidified environment of 5% $CO_2$ in air at 37° C. prior to experimental use the next day.
Subcutaneous Islet Transplantation in Diabetic Mice (Syngeneic Model).

Mouse islet transplantation procedures were approved by the Indiana University Institutional Animal Care and Use Committee using AALAC guidelines. Male 8-wk to 14-wk old C57BL/6J (syngeneic model) recipient mice were injected with low dose streptozotocin (55 mg/kg) for 5 days to chemically induce diabetes prior to islet transplantation. C57BL/6J islets were mixed with neutralized collagen solutions. Collagen-islet suspensions were then injected subcutaneously through small bore needles (26½G) into diabetic mice. Each mouse received 2 injections, one positioned laterally on each side of the back, with approximately 250 islets/500 µL collagen (oligomer) solution neutralized with the self-assembly reagent of Example 1 per site for a total of 500 islets/mouse. Additional mice received 2 injections of islets suspended in saline (islets only; 250 islets/500 µL saline/site) or neutralized collagen solution (collagen only: 500 µL collagen/site) for comparison. Non-fasting blood glucose was measured 3 times per week after transplantation. Diabetes was classified as two consecutive blood glucose levels above 250 mg/dL.
Intraperitoneal Glucose Tolerance Test.

Intraperitoneal glucose tolerance tests (GTT) were performed at specified times following subcutaneous transplantation to assess islet responsiveness to glucose challenges. Mice were fasted overnight, and then injected intraperitoneally with 2 g/kg of 20% glucose. Blood glucose levels were measured at baseline before injection (time 0) and 15, 30, 60, 90, and 120 minutes following glucose injection.
In-Vivo Histology and Immunofluorescence.

Injection sites and surrounding tissues were removed at specified timepoints and placed in 10% formalin before paraffin embedding and sectioning. Sections were stained with hematoxylin and eosin (H&E) and Masson's trichrome (MTC). For immunofluorescence, sections were deparaffinized, rehydrated, and stained with primary guinea pig anti-insulin (A0564, Dako, Santa Clara, CA) and rabbit anti-glucagon (sc-13091, Santa Cruz Biotechnology, Dallas, TX) at 1:500 dilutions. Sections were then treated with secondary Alexa Fluor 488 goat anti-guinea pig (A11073, Life Technologies) and Alexa Fluor 568 goat anti-rabbit (A11036, Life Technologies) at 1:50 and 1:200 dilutions, respectively. Nuclei were counterstained with DRAQ5™.
Summary of Results.

Figure 9:
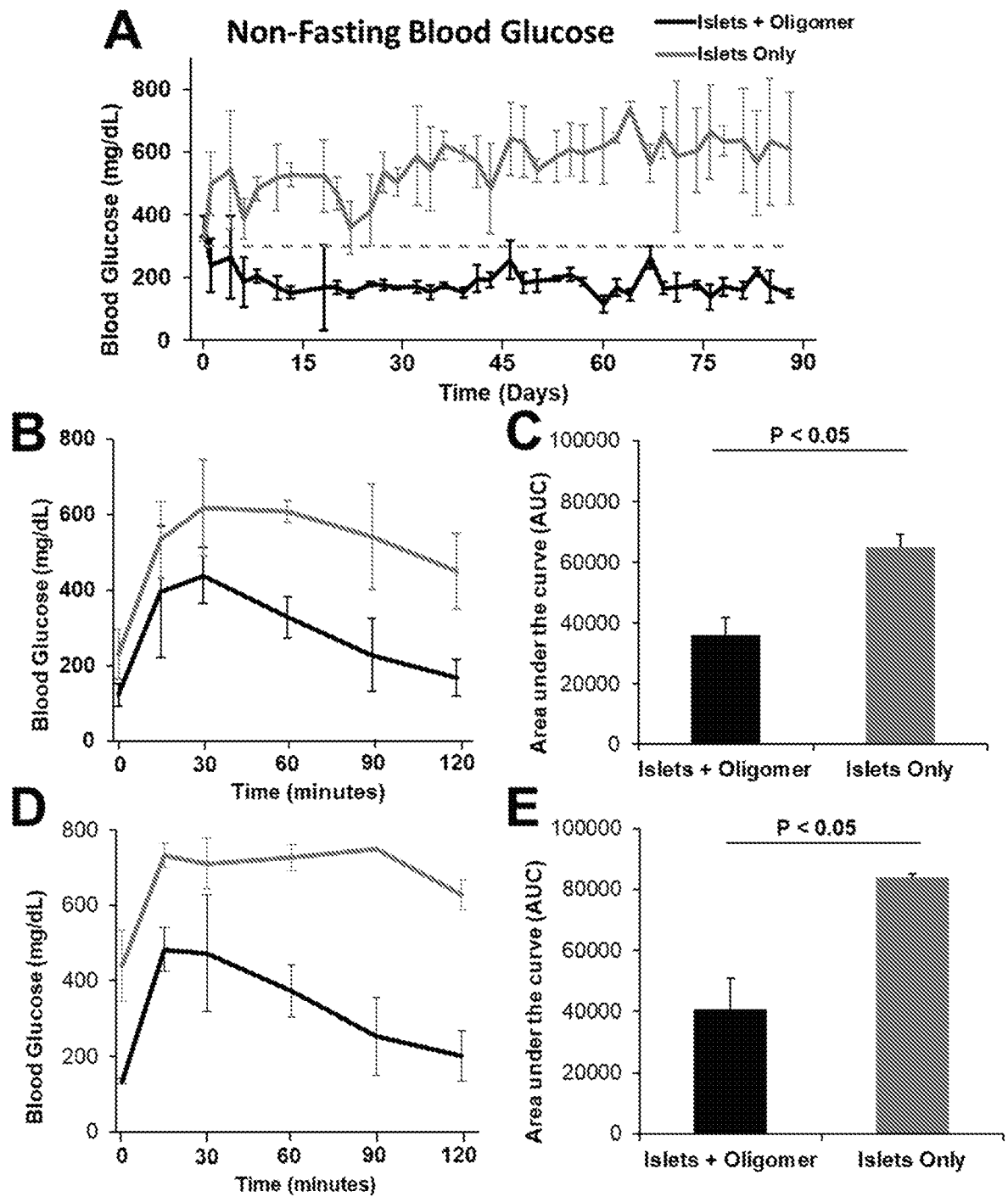
FIG. 9. In (A), non-fasting blood glucose levels (mean±SD) following subcutaneous in-situ macroencapsulation of syngeneic islets in polymerized collagen-3.0 mg/mL (n=3) within diabetic C57BL/6J mice compared to islet only group (n=3). Mice receiving macroencapsulated islets achieved normoglycemia within 24 hours following transplantation. Blood glucose remained below the diabetic threshold (<250 mg/dL; dashed line) throughout the 90-day study period. The control group remained diabetic throughout the study with widely varying blood glucose values. Glucose tolerance test (mean±SD) and associated area under the curve (AUC; mean±SD) analysis 15 (B,C) and 90 (D,E) days following transplantation demonstrated the capacity of islets+polymerized collagen group but not islets-only group to rapidly regulate blood glucose levels following glucose injection. AUC values for islets+polymerized collagen group were significantly ($p<0.05$) less than those for islet only controls at both time points.
Figure 10:
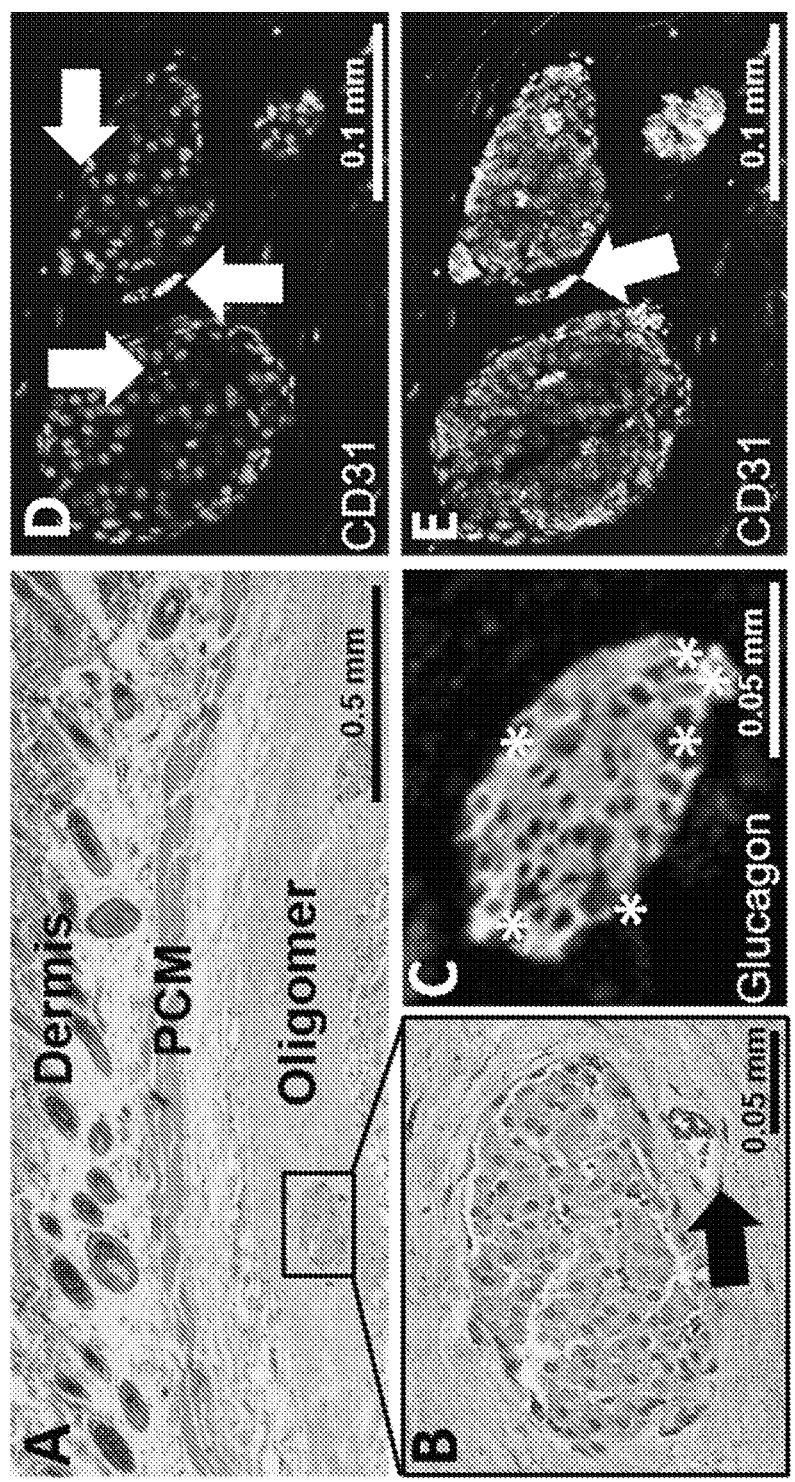
FIG. 10. Histopathological analysis of polymerized collagen-encapsulated (3.0 mg/mL), syngeneic islets 90 days following subcutaneous transplantation within diabetic mice (A and B). H&E stained cross-sections showing polymerized collagen encapsulated islets within the subcutaneous space below the panniculus carnosus muscle (PCM). The fibrillar collagen matrix formed by polymerized collagen persisted and integrated with surrounding host tissues, with evidence of functional revascularization (panel B, black arrow). Encapsulated islets stained positive for insulin and glucagon (as indicated by asterisks) in (C). CD31 (white arrows) staining confirmed the presence of endothelial cells near islets co-stained to visualize insulin and nuclei in (D) and (E).
Figure 11:
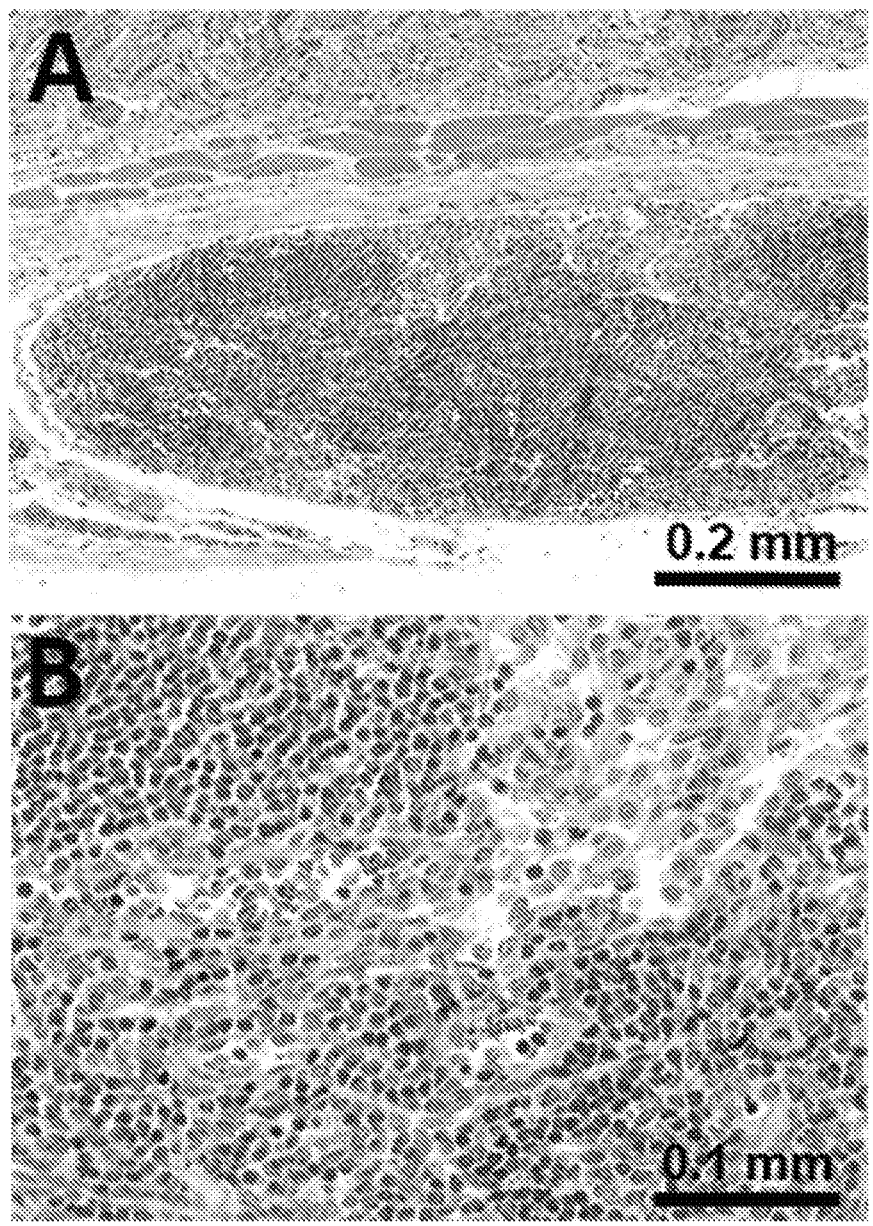
FIG. 11(A, B). Histopathological analysis of explant 90-days following subcutaneous transplantation of islets only within diabetic mice showed evidence of inflammatory-mediate destruction and necrosis of islets.

Syngeneic mouse islets suspended in collagen 1000 Pa (3 mg/mL) and injected subcutaneously within diabetic mice showed rapid engraftment and function as indicated by rapid reversal of diabetes within 24 hours following transplantation in all three recipient mice (FIG. 9A). Blood glucose levels for these animals remained below the diabetic level throughout the 90-day study period with tight regulation as indicated by the small standard deviation bars. In contrast, mice transplanted with islets only remained diabetic with blood glucose values over 400 mg/dL (FIG. 9A). Intraperitoneal glucose tolerance testing (GTT) was performed on day 15 (FIGS. 9B and 9C) and 90 (FIGS. 9D and 9E) to further assess glucose responsiveness of transplanted islets. Interestingly, mice receiving collagen 1000 Pa+islets achieved normoglycemia 120 min post-glucose injection while blood glucose in islet only mice remained elevated above basal levels at both 15 and 90 day timepoints (FIGS. 9B and 9D). Analysis of area under the curve (AUC) indicated that values for mice receiving collagen 1000 Pa+islets were significantly lower than those for islet only mice at both timepoints ($p<0.05$; FIGS. 9C and 9E). Histolopathologic and immunostaining analyses at 90 days showed persistence of the collagen material with integration into the surrounding subcutaneous tissue compartment and no evidence of chronic inflammatory or foreign body response (FIG. 5A). Within the collagen 1000 Pa, islets maintained their rounded, multicellular architecture with evidence of a rich capillary supply and insulin- and glucagon-positive cells (FIGS. 10A, B, and C) and nearby patent vasculature (FIG. 10B) and CD-31 positive cells (FIGS. 10D and 10E). Islet only explants showed a robust foreign-body response marking graft failure (FIGS. 11A and 11B).

Example 5. Reversal of Diabetes with Immune Modulation Following In-Situ Oligomer Encapsulation of Allogeneic Islets To assess function and immunoprotection of collagen-encapsulated islets following subcutaneous delivery, allogeneic transplantation studies were performed, where CD1 mouse islets were injected into diabetic C57BL/6J mice.
Mouse Islets.

Mouse pancreatic islets were isolated from 8- to 14-wk old CD1 mice (Jackson Laboratory, Bar Harbor, ME) according to methods of Stull and coworkers. Islet isolations were approved by the Indiana University Institutional Animal Care and Use Committee using AALAC guidelines. Isolated islets were incubated in RPMI 1640 medium supplemented with 10% fetal bovine serum (HyClone, ThermoFisher Scientific, Waltham, MA), 100 U/mL penicillin, and 100 µg/mL streptomycin (Sigma Aldrich, St. Louis, MO) in a humidified environment of 5% $CO_2$ in air at 37° C. prior to experimental use the next day.
Subcutaneous Islet Transplantation in Diabetic Mice (Allogeneic Model).

Mouse islet transplantation procedures were approved by the Indiana University Institutional Animal Care and Use Committee using AALAC guidelines. Male 8-wk to 14-wk old C57BL/6J recipient mice were injected with low dose streptozotocin (55 mg/kg) for 5 days to chemically induce diabetes prior to islet transplantation. CD1 islets were mixed with collagen (oligomer) solution neutralized with the self-assembly reagent of Example 1 and the resulting collagen-islet suspensions were then injected subcutaneously through small bore needles (26½G) into diabetic mice. Each mouse received 2 injections, one positioned laterally on each side of the back, with approximately 250 islets/500 µL collagen/site for a total of 500 islets/mouse. Non-fasting blood glucose was measured 3 times per week after transplantation. Diabetes was classified as two consecutive blood glucose levels above 250 mg/dL.
In-Vivo Histology and Immunofluorescence.

Injection sites and surrounding tissues were removed at specified timepoints and placed in 10% formalin before paraffin embedding and sectioning. Sections were stained with hematoxylin and eosin (H&E) and Masson's trichrome (MTC). For immunofluorescence, sections were deparaffinized, rehydrated, and stained with primary guinea pig anti-insulin (A0564, Dako, Santa Clara, CA) and rabbit anti-glucagon (sc-13091, Santa Cruz Biotechnology, Dallas, TX) at 1:500 dilutions. Sections were then treated with secondary Alexa Fluor 488 goat anti-guinea pig (A11073, Life Technologies) and Alexa Fluor 568 goat anti-rabbit (A11036, Life Technologies) at 1:50 and 1:200 dilutions, respectively. Nuclei were counterstained with DRAQ5™.
Summary of Results.

Figure 12:
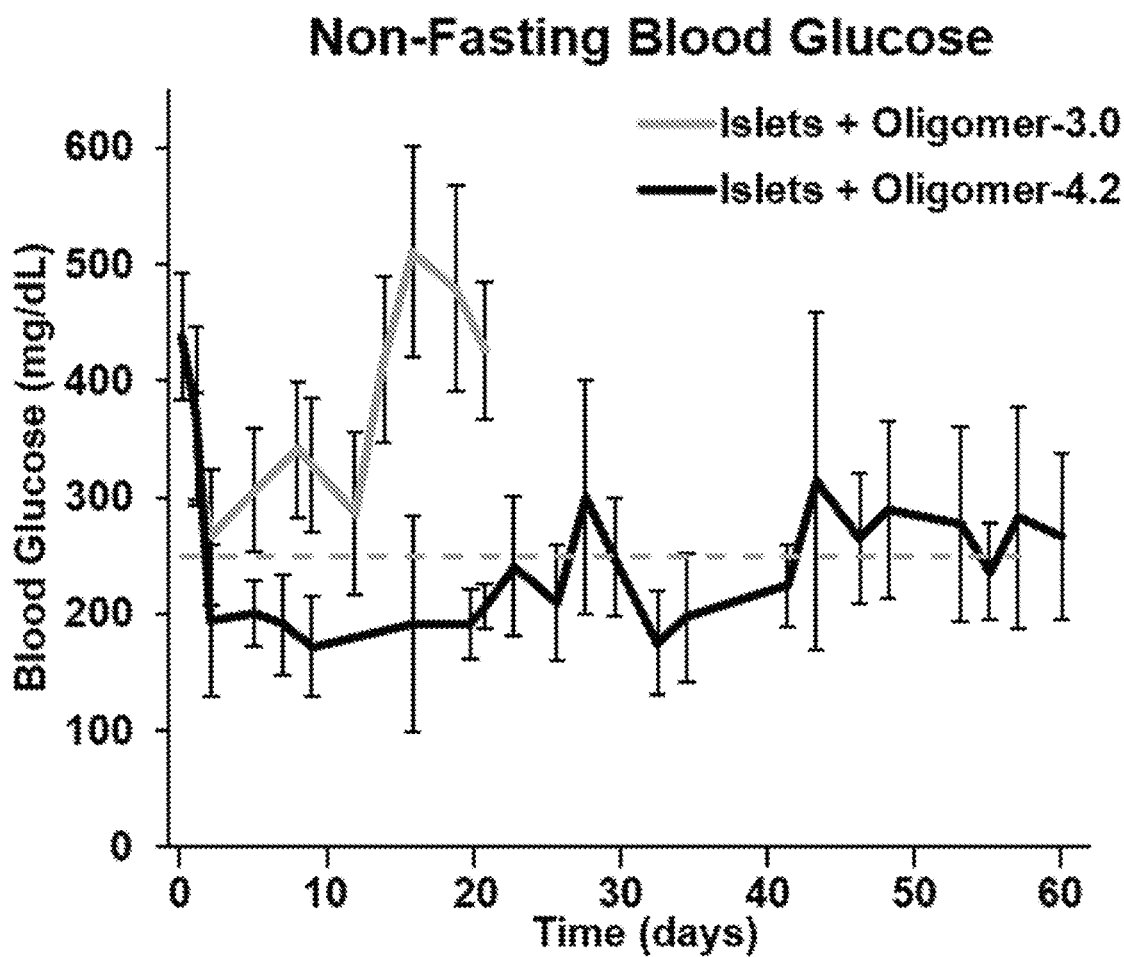
FIG. 12. Non-fasting blood glucose levels (mean±SD) following subcutaneous in-situ macroencapsulation of allogeneic CD1 mouse islets in polymerized collagen-3.0 mg/mL (n=3) and polymerized collagen-4.2 mg/mL (n=5) within diabetic C57BL/6J mice. Dashed line at blood glucose level of 250 mg/dL represents diabetic threshold.
Figure 13:
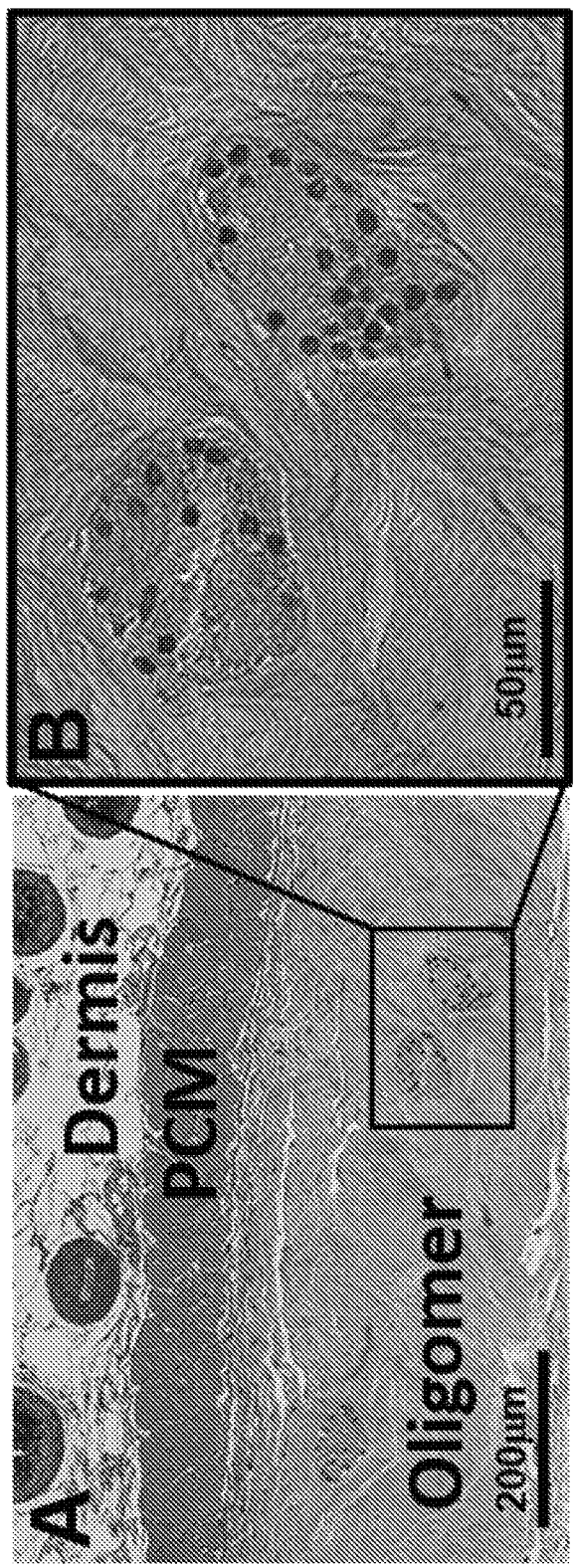
FIG. 13. Histopathological analysis of polymerized collagen-encapsulated (4.2 mg/mL), allogeneic islets 60 days following subcutaneous transplantation. (A,B). H&E stained cross-sections showing encapsulated islets within the subcutaneous space below the panniculus carnosus muscle (PCM) with no evidence of a foreign body reaction against the polymerized collagen or allogeneic islets.
Figure 14:
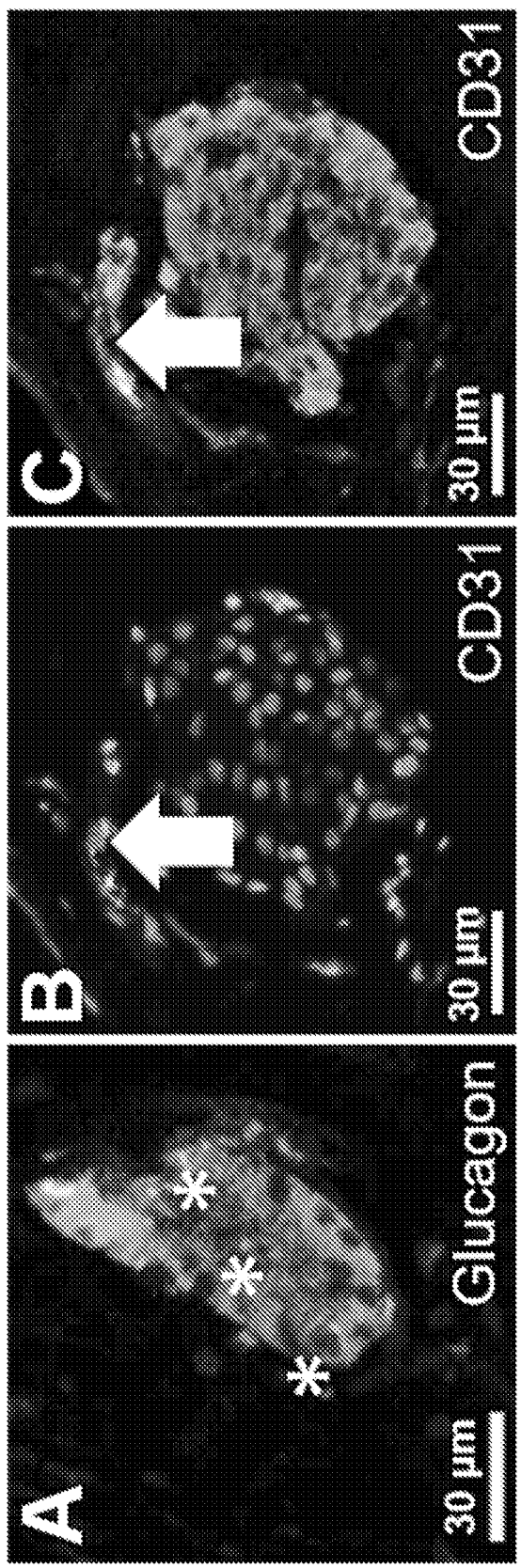
FIG. 14. Immunostained explants of polymerized collagen-encapsulated (4.2 mg/mL) allogeneic islets 60 days following subcutaneous transplantation. Islets stained positive for insulin and glucagon (asterisk) are seen in (A), with CD31 (B-C; see arrows) staining confirming the presence of endothelial cells near islets co-stained for insulin and nuclei.

When the islets-collagen compositions were injected subcutaneously, polymerization occurred in vivo causing the islets to become macroencapsulated in polymerized collagen at 3 mg/mL. Blood glucose values declined within the first 24 hours; however, animals remained hyperglycemic (FIG. 12). Hypothesizing that the level of immune protection may be related to the amount of oligomer (or fibril density), follow-up animals were performed using an collagen concentration of 4.2 mg/mL, which corresponds roughly to an oligomer stiffness value of 2000 Pa and polymerization half-time of 16.30±0.02 seconds. In this case, diabetes was reversed within 24 hours with blood glucose values gradually increasing above the diabetic threshold after about 40 days (FIG. 12). Histopathologic and immunostaining analyses of 60-day oligomer-islet explants showed insulin- and glucagon-positive islets surrounded by fibrillar collagen (FIG. 13). Interestingly, a subset of islets showed no evidence of a foreign body response, while others showed very mild inflammatory infiltrate. In some instances, nearby vasculature was evident (FIG. 14); however, vascularization and inflammation events did not appear to be correlated.

Example 6. Human Islets Show Improved Viability, Cytoarchitecture, and Function in-Vitro Following Creation of Polymerized Collagen-Islet Constructs Human Islets.

Human pancreatic islets were obtained through the Integrated Islet Distribution Program (IIDP). Protocols for handling of human islets were approved by the Purdue Institutional Biosafety Committee. Islets were maintained overnight in Prodo Islet Media (Recovery; Prodo Laboratories, Aliso Viejo, CA) supplemented with 5% human AB serum (Prodo Laboratories), 1% Glutamine/Glutathione (Prodo Laboratories), and 100 U/mL penicillin, and 100 µg/mL streptomycin (Sigma Aldrich) in a humidified environment of 5% $CO_2$ in air at 37° C. prior to use in experiments.
Collagen Encapsulation of Human Islets for In-Vitro Culture.

To prepare polymerized collagen matrices at different stiffness (G') values, stock acidic collagen solutions were diluted with 0.01 N HCl so to achieve final collagen concentrations of 4 mg/mL in the polymerization reaction. These polymerization reaction concentrations yield polymerized matrices with shear storage modulus (G', Pa; also referred to generally as stiffness) of about 1500 Pa, as defined by the collagen's polymerization capacity. The polymerization reaction was initiated by adding 10× self-assembly solution of Example 1 to the acidic collagen solution (9 parts acidic collagen solution and 1 part 10× self-assembly solution of Example 1) to form a neutralized collagen solution. Human islets were suspended in the neutralized collagen solutions, aliquoted into 96 well-plates (30 islets/100 µL; Cellvis, Sunnyvale, CA), and allowed to polymerize at 37° C. Immediately following polymerization, culture medium was added, and the collagen-islet constructs were cultured for up to 14 days with medium changes made daily. For comparison purposes, human islets were also cultured in a conventional suspension format in liquid medium.

Assessment of Mouse and Human Islet Viability and Function Following In-Vitro Culture.

Islets cultured suspended in liquid or as polymerized collagen-islet constructs were treated with Calcein AM and propidium iodide (Molecular Probes, Eugene, OR) for live-dead determinations. Images were collected using laser scanning confocal microscopy on an Olympus IX81 inverted microscope adapted with Olympus Fluoview FV1000 (Olympus, Tokyo, Japan), Image stacks of 40-100 µm thickness with a 3 µm step size were obtained using a 20× air objective, and z-projections were created using Imaris software (Bitplane, Concord, MA). Individual islet viability was assessed qualitatively. Immunofluorescence was used to qualitatively assess islet cytoarchitecture and function. Islets cultured suspended in liquid or as polymerized collagen-islet constructs were fixed in 3% paraformaldehyde (Mallinckrodt, Derbyshire, UK), permeabilized with 0.1% Triton X-100 (Sigma Aldrich), and blocked with 1% bovine serum albumin (Jackson ImmunoResearch, West Grove, PA). Samples then were treated overnight at 4° C. with primary guinea pig anti-insulin (PA1-26938, Invitrogen) and rabbit anti-glucagon antibodies (mouse islets: ab10988, Abcam, Cambridge, MA; human islets: 2760, Cell Signaling Technologies, Danvers, MA). Samples were rinsed and then treated with secondary antibodies (A11073, goat anti-guinea pig Alexa Fluor 488 conjugate and A11035, goat anti-rabbit Alexa Fluor 546 conjugate, Life Technologies) overnight at 4° C. After rinsing, samples were treated with DRAQ5™ (Cell Signaling Technologies, Danvers, MA) to stain nuclei. Quantitative assessment of islet function was performed via glucose stimulated insulin secretion (GSIS) testing. Islets cultured suspended in liquid or as polymerized collagen-islet constructs were prepared within 24-well Transwell culture inserts (Corning, Kennebunk, ME) for up to 14 days. Basal insulin secretion was stimulated by incubating the samples for 1 hour with 2.8 mM glucose in Krebs Ringer buffer (0.1% BSA, 25 mM HEPES, 115 mM NaCl, 24 mM NaHCO$_3$, 5 mM KCl, 1 mM MgCl$_2$·6H$_2$O, 2.5 mM CaCl$_2$·2H$_2$O). Following basal secretion, samples underwent static incubation for 1 hour each, with low (2.8 mM) followed by high (28 mM) glucose concentrations in Krebs Ringer buffer. Insulin secretion was measured using a STEL-LUX® insulin enzyme-linked immunosorbent assay (ELISA) kit (Alpco, Salem, NH). Values were reported as a stimulation index (SI), which represents the ratio of insulin secreted with high glucose (ng/mL) over insulin secreted with low glucose stimulation (ng/mL).

Summary of Results.

The in-vitro culture of collagen-encapsulated human islets was found to maintain human islet survival and function beyond 14 days. Immunostaining revealed maintenance of islet cytoarchitecture and phenotype with insulin- and glucagon-positive cells (FIG. 15A), with over 80% of islet showing minimal to no component cell death. Finally, islets encapsulated and cultured for 14 days in 4.0 mg/mL collagen showed statistically similar (p>0.05) GSIS function compared to Day 0 islets (FIG. 15B). As expected, suspension islets showed poor viability (>90% significant death) and a significant decrease (p<0.05) in GSIS function following 14 days of culture (FIG. 15B).

Example 7. Subcutaneous Transplantation of Human Islets in Diabetic Mice: Short-Term Xenogeneic Model Mice received two subcutaneous injections with 1000 islets equivalents/500 µL collagen (oligomer) solution neutralized with the self-assembly reagent of Example 1 per site for a total of 2000 islet equivalents/mouse. Additional mice received two injections of islets only (2000 islet equivalents/ 500 µL saline/site) for comparison. For this study, both collagen 1000 Pa (3.0 mg/mL) and collagen 2000 Pa (4.2 mg/mL) formulations were applied.

Subcutaneous Islet Transplantation in Diabetic Mice (Xenogeneic Model).

Human islet transplantation procedures were approved by the Indiana University Institutional Animal Care and Use Committee using AALAC guidelines. Male 8-wk to 14-wk old C57BL/6J (xenogeneic model) recipient mice were injected with low dose streptozotocin (55 mg/kg) for 5 days to chemically induce diabetes prior to islet transplantation. Human islets were mixed with neutralized collagen solutions. Collagen-islet suspensions were then injected subcutaneously through small bore needles (26½ G). Each mouse received 2 injections, one positioned laterally on each side of the back, with 1000 islet equivalents/500 µL collagen/site for a total of 2000 islet equivalents/mouse. Additional mice received 2 injections of islets suspended in saline (islets only; 2000 islet equivalents/500 µL saline/site) for comparison. Non-fasting blood glucose was measured 3 times per week after transplantation. Diabetes was classified as two consecutive blood glucose levels above 250 mg/dL.

In-Vivo Histology and Immunofluorescence.

Injection sites and surrounding tissues were removed at specified timepoints and placed in 10% formalin before paraffin embedding and sectioning. Sections were stained with hematoxylin and eosin (H&E) and Masson's trichrome (MTC). For immunofluorescence, sections were deparaffinized, rehydrated, and stained with primary guinea pig anti-insulin (A0564, Dako, Santa Clara, CA) and rabbit anti-glucagon (sc-13091, Santa Cruz Biotechnology, Dallas, TX) at 1:500 dilutions. Sections were then treated with secondary Alexa Fluor 488 goat anti-guinea pig (A11073, Life Technologies) and Alexa Fluor 568 goat anti-rabbit (A11036, Life Technologies) at 1:50 and 1:200 dilutions, respectively. Nuclei were counterstained with DRAQ5™.

Summary of Results.

Although all mice maintained hyperglycemia for 9 days following transplant, histopathological analysis showed that collagen 2000 Pa encapsulated human islets were viable and maintained their normal multicellular structure (FIG. 10A-B). There was no evidence of an acute inflammatory reaction, and little to no neovascularization of islets was observed at 9 days (FIG. 10A-B). Islet only explants showed evidence of islet degranulation and destructive necrosis similar to that observed with allogeneic and syngeneic transplantation.

Example 8. Incorporation of Accessory Cells as Well as Therapeutic Drugs in the Collagen-Islet Suspension for Further Augmentation of Islet Longevity and Function The polymerizable collagen represents the first injectable islet delivery vehicle that undergoes in-situ self-assembly and encapsulation, it can be further adapted by incorporating accessory cell populations or therapeutic drugs to enhance islet longevity and function. For example, islets, along with vessel-forming endothelial colony forming cells, can be incorporated into the collagen suspension to achieve accelerated vascularization as well as improved longevity and function. Alternatively, immunomodulatory agents may be added to the collagen-islet suspension to achieve enhanced local immunoprotection of islets, thereby reducing or eliminating the need for systemic immunosuppression.

Addition of Therapeutic Drugs.

Figure 17:
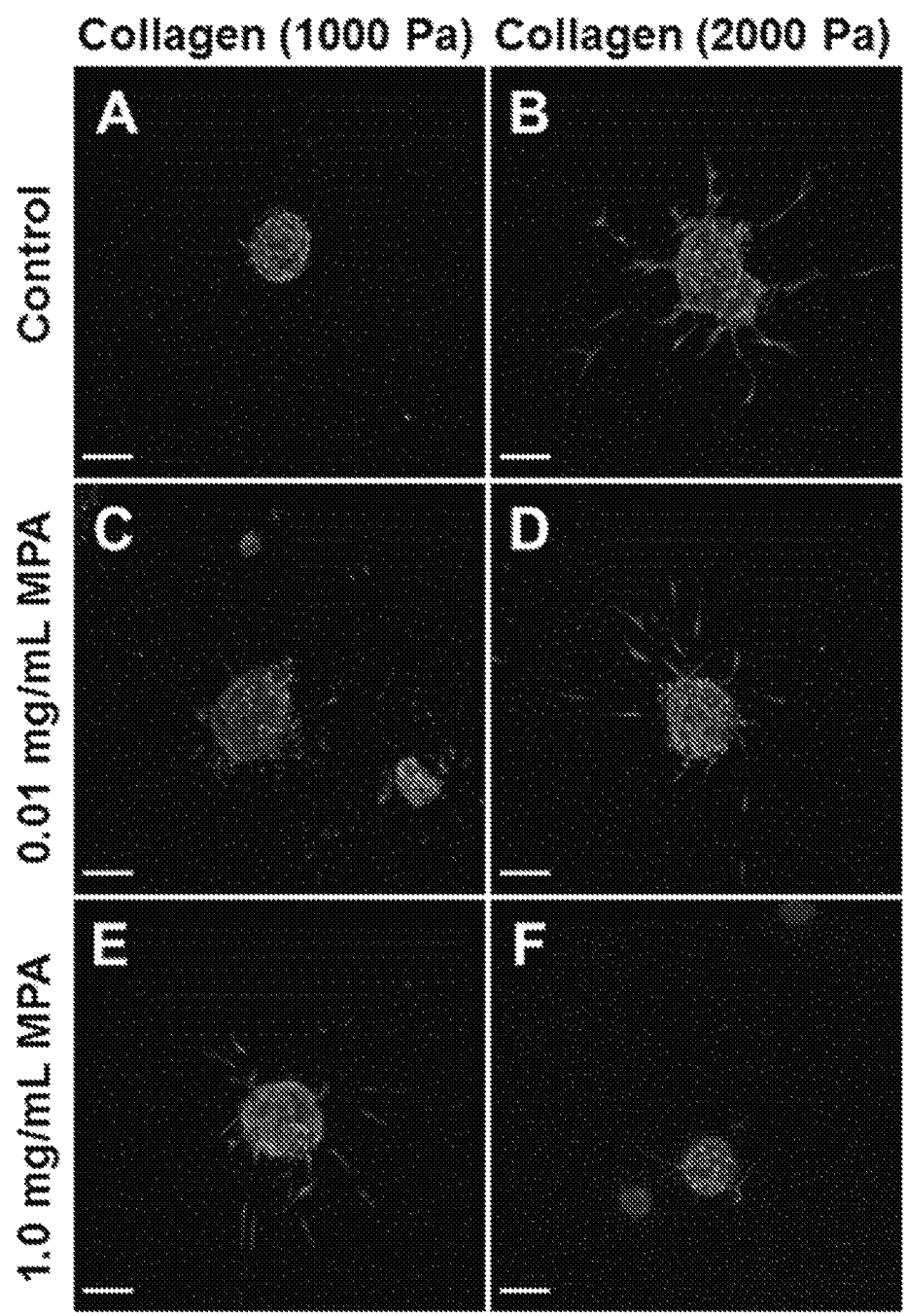
FIG. 17. Effect of mycophenolic acid (MPA) on islet viability when incorporated as a local immunomodulatory agent within polymerizable collagen-islet suspensions. Neutralized collagen prepared at 1000 Pa (A,C,E) or 2000 Pa (B,D,F) was mixed with human islets alone (control; A,B) or human islets and either 0.01 mg/ml (C,D) or 1.0 mg/ml (E,F) MPA. The collagen-islet-MPA suspension was polymerized within a well-plate and cultured for 7 days. Islet viability was detected using calcein AM (live) and propidium iodide (dead; as indicated by small round dots) and imaged via confocal microscopy. Scale bar=100 µm.
Figure 18:
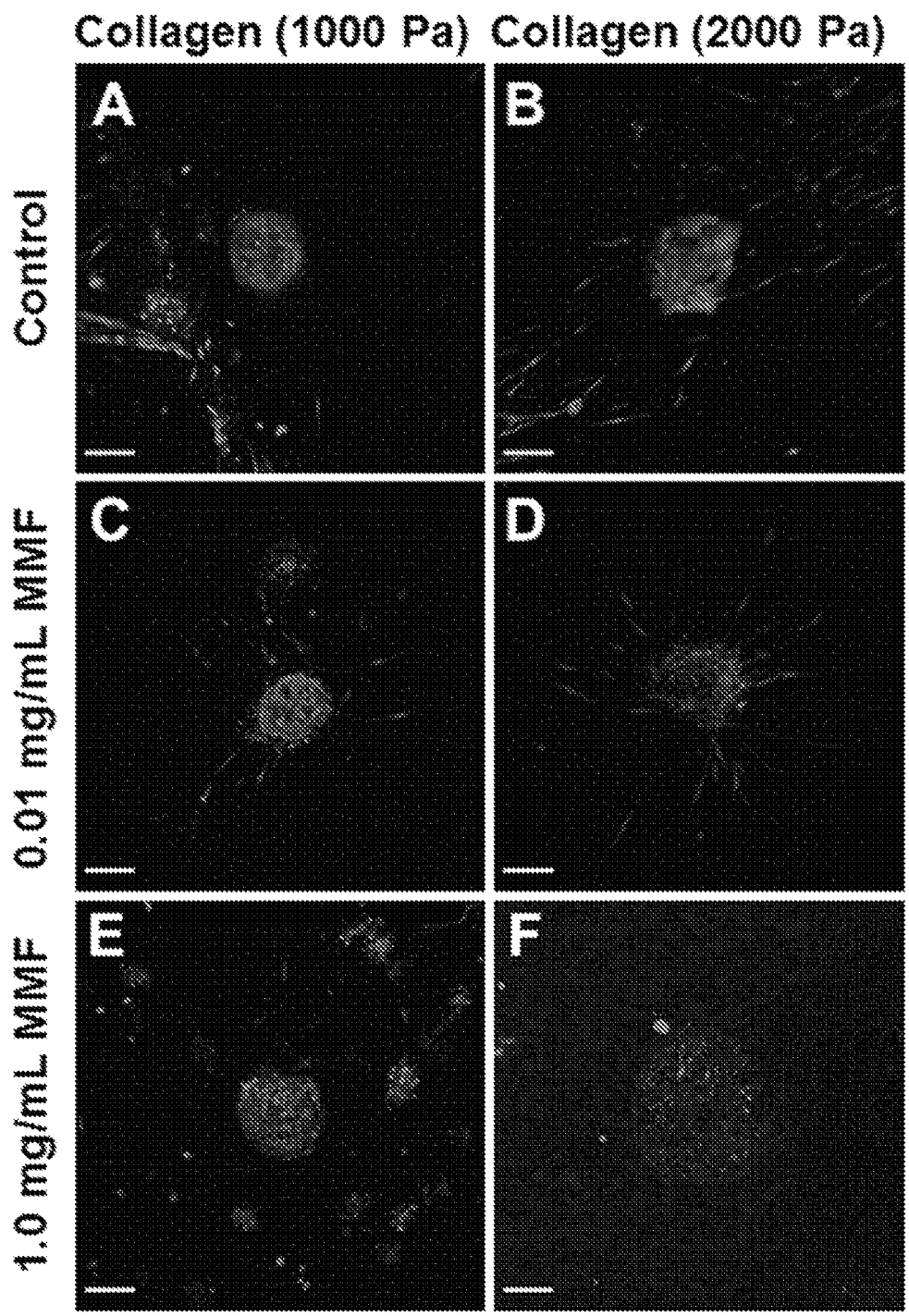
FIG. 18. Effect of mycophenolate mofetil (MMF) on islet viability when incorporated as a local immunomodulatory agent within polymerizable collagen-islet suspensions. Neutralized collagen prepared at 1000 Pa (A,C,E) or 2000 Pa (B,D,F) was mixed with human islets alone (control; A,B) or human islets and either 0.01 mg/ml (C,D) or 1.0 mg/ml (E,F) MMF. The collagen-islet-MMF suspension was polymerized within a well-plate and cultured for 7 days. Islet viability was detected using calcein AM (live) and propidium iodide (dead; as indicated by small round dots) and imaged via confocal microscopy. Scale bar=100 µm.

FDA-approved immunosuppressant mycophenolic acid (MPA) in its prodrug (mycophenolate mofetil; MMF) or active forms into the neutralized collagen solution along with human islets were incorporated into the oligomer constructs. The polymerized collagen-islets constructs were maintained in culture for 7 days to define how drug concentration affected islet viability over time. Stock MPA and MMF solutions (50 mg/mL) were prepared by dissolution in methanol and DMSO, respectively. MPA and MMF solutions were added to the acidic collagen solution of Example 1. The acidic collagen solution containing drugs was then neutralized with self-assembly reagent to achieve 1000 Pa and 2000 Pa collagen and final drug concentrations between 0 mg/mL and 1 mg/mL. Results showed that MPA (FIG. 17) and MMF (FIG. 18) had no observable effect on islet viability when incorporated into islet-collagen constructs compared to controls.

Addition of Accessory Cells.

Figure 19:
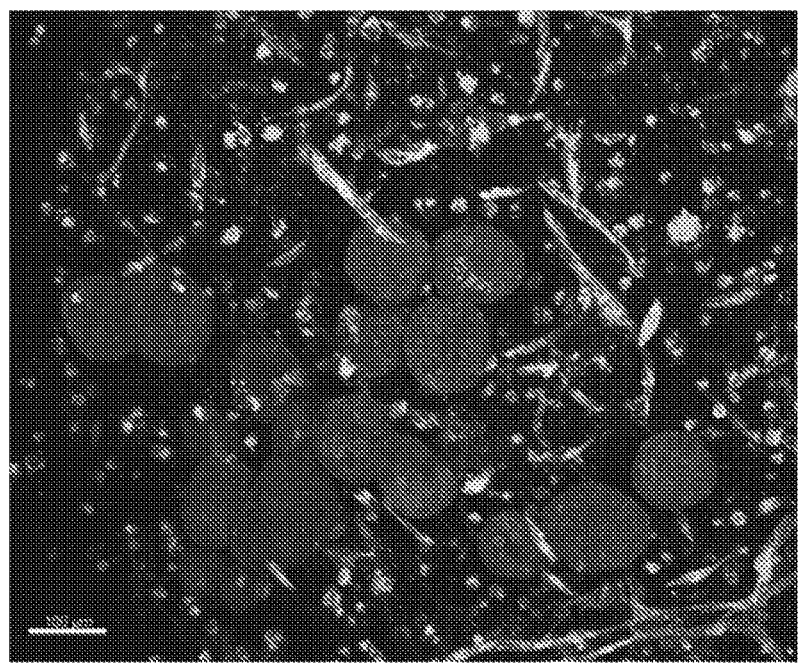
FIG. 19. Confocal image of polymerized collagen-islet-endothelial colony forming cell (ECFC) construct following 7 days of culture. Mouse islets and human ECFCs were suspended in neutralized collagen solution and used to create polymerized collagen-islet-ECFC constructs. Within the polymerized collagen, ECFC underwent vasculogenesis forming vessel-networks that interfaced with nearby islets.

Early studies involved mixing mouse islets and human-derived endothelial colony forming cells (ECFC) within neutralized collagen solutions for creation and in-vitro culture of polymerized collagen-islet-ECFC constructs. After 7 days in culture, ECFC formed vessel-networks that appeared to interface with islets (FIG. 19). Human ECFCs were isolated from umbilical cord blood and cultured as described previously. Ingram, D. A.; Mead, L. E.; Tanaka, H.; Meade, V.; Fenoglio, A.; Mortell, K.; Pollok, K.; Ferkowicz, M. J.; Gilley, D.; Yoder, M. C. Identification of a Novel Hierarchy of Endothelial Progenitor Cells Using Human Peripheral and Umbilical Cord Blood. Blood 2004, 104, 2752-2760. ECFCs were propagated in complete endothelial cell growth medium (EGM-2, Lonza, Walkersville, MD) supplemented with 10% fetal bovine serum (HyClone, ThermoFisher Scientific, Waltham, MA). Cells were grown and maintained in a humidified environment of 5% $CO_2$ in air at 37° C. Mouse islets were isolated as described in Example 1. Isolated islets were encapsulated and cultured for 4 days with endothelial colony forming cells (ECFCs) using an multitissue interface format described in Buno K P, Chen X, Weibel J A, Thiede S N, Garimella S V, Yoder M C, Voytik-Harbin S L. In Vitro Multitissue Interface Model Supports Rapid Vasculogenesis and Mechanistic Study of Vascularization across Tissue Compartments. ACS Appl Mater Interfaces. 2016 Aug. 31; 8(34):21848-60. 10 uL spheres of oligomer ranging in concentration from 1.5 mg/mL to 3.0 mg/mL were used to encapsulate mouse islets (10 islets/sphere). The cell density of ECFCs within the sphere was $5 \times 10^5$ cells/mL. Then, the sphere was further embedded in a surrounding oligomer matrix (1.5 to 3.0 mg/mL; 250 uL; 48-well plate) with an ECFC cell density of $3 \times 10^6$ cells/mL. Immunofluorescent staining was performed for further visualization of the islet-ECFC constructs. Phallodin (red) was used to distinguish all cells, UEA-1 Lectin (green) was used to distinguish ECFCs, and DRAQ5 (blue) for nuclei.

The following clauses provide numerous embodiments and are non-limiting:

Clause 1. A composition comprising collagen and insulin-producing cells in an aqueous medium.

Clause 2. The collagen-insulin-producing cell composition of clause 1, wherein the collagen is type I collagen.

Clause 3. The collagen-insulin producing cell composition of clause 1, wherein the collagen is oligomeric collagen.

Clause 4. The collagen-insulin-producing cell composition of clauses 1-3, wherein the composition further comprises a self-assembly reagent.

Clause 5. The collagen-insulin-producing cell composition of clause 4, wherein the reagent is in solution.

Clause 6. The collagen-insulin-producing cell composition of clauses 4-5, wherein pH of the composition is physiologic pH.

Clause 7. The collagen-insulin-producing cell composition of clauses 4-6, wherein the ionic strength of the composition is physiologic ionic strength.

Clause 8. The collagen-insulin-producing cell composition of clauses 4-6, wherein the composition is capable of polymerizing.

Clause 9. The collagen-insulin-producing cell composition of clauses 1-8 in the form of a suspension.

Clause 10. The collagen-insulin-producing cell composition of clauses 1-9, wherein the temperature of the composition is physiologic temperature.

Clause 11. The collagen-insulin-producing cell composition of clauses 1-10, wherein the insulin-producing cells are islets.

Clause 12. The collagen-insulin-producing cell composition of clause 11, wherein the islets are pancreatic islets.

Clause 13. The collagen-insulin-producing cell composition of clause 11, wherein the islets are autograft islets.

Clause 14. The collagen-insulin-producing cell composition of clause 11, wherein the islets are allogeneic islets.

Clause 15. The collagen-insulin-producing cell composition of clause 11, wherein the islets are xenogeneic islets.

Clause 16. The collagen-insulin-producing cell composition of clause 11, wherein the islets are derived from a genetically modified animal.

Clause 17. The collagen-insulin-producing cell composition of clauses 1-10, wherein the insulin-producing cells are stem cell-derived insulin-producing cells.

Clause 18. The collagen-insulin-producing cell composition of clause 17, wherein the stem-cell derived insulin-producing cells are derived from induced pluripotent stem cells, embryonic stem cells, or adult stem cells.

Clause 19. The collagen-insulin-producing cell composition of clauses 1-18, wherein the insulin-producing cells are progenitor-derived insulin-producing cells.

Clause 20. The collagen-insulin-producing cell composition of clauses 1-10, wherein the insulin-producing stem cells are genetically modified.

Clause 21. The collagen-insulin-producing cell composition of clauses 3-19, wherein the concentration of oligomeric collagen is between about 0.5 mg/mL and about 40 mg/mL.

Clause 22. The collagen-insulin-producing cell composition of clause 21, wherein the concentration of oligomeric collagen is between about 0.5 mg/mL and 30 mg/mL.

Clause 23. The collagen-insulin-producing cell composition of clause 21, wherein the concentration of oligomeric collagen is between about 1 mg/mL and about 21 mg/mL.

Clause 24. The collagen-insulin-producing cell composition of clause 21, wherein the concentration of oligomeric collagen is between about 1 mg/mL and about 10 mg/mL.

Clause 25. The collagen-insulin-producing cell composition of clause 21, wherein the concentration of oligomeric collagen is between about 1 mg/mL and about 5 mg/mL.

Clause 26. The collagen-insulin-producing cell composition of clause 21, wherein the concentration of oligomeric collagen is between about 1.5 mg/mL and about 5 mg/mL.

Clause 27. The collagen-insulin-producing cell composition of clause 21, wherein the concentration of oligomeric collagen is between about 1.5 mg/mL and about 4.2 mg/mL.

Clause 28. The collagen-insulin-producing cell composition of clause 21, wherein the concentration of oligomeric collagen is between about 2.2 mg/mL and about 4.2 mg/mL.

Clause 29. The collagen-insulin-producing cell composition of clause 21, wherein the concentration of oligomeric collagen is between about 3.0 mg/mL and about 4.2 mg/mL.

Clause 30. The collagen-insulin-producing cell composition of clause 21, wherein the concentration of oligomeric collagen is about 3.0 mg/mL.

Clause 31. The collagen-insulin-producing cell composition of clause 21, wherein the concentration of oligomeric collagen is about 4.2 mg/mL.

Clause 32. The collagen-insulin-producing cell composition of clauses 1-31, wherein the composition is kept at less than 10° C.

Clause 33. The collagen-insulin-producing cell composition of clauses 1-32, wherein the composition is kept at about 4° C.

Clause 34. The collagen-insulin-producing cell composition of clauses 1-31, wherein the composition is kept at physiologic temperature.

Clause 35. The collagen-insulin-producing cell composition of clauses 4-34, wherein the self-assembly reagent comprises a buffer.

Clause 36. The collagen-insulin-producing cell composition of clauses 4-25, wherein the self-assembly reagent comprises a base.

Clause 37. The collagen-insulin-producing cell composition of clause 4-36, wherein the self-assembly reagent comprises a buffer.

Clause 38. The collagen-insulin-producing cell composition of clause 37, wherein the base is NaOH and the buffer is KH2PO4 and Na2HPO4.

Clause 39. The collagen-insulin-producing cell composition of clause 38, wherein the reagent further comprises NaCl, KCl, and a sugar.

Clause 40. The collagen-insulin-producing cell composition of clause 39, wherein the sugar is glucose.

Clause 41. The collagen-insulin-producing cell composition of clauses 12-40, wherein the pancreatic islets are from a mammal.

Clause 42. The collagen-insulin-producing cell composition of clause 41, wherein the mammal is dog, cat, rodent, porcine, or human.

Clause 43. A collagen-insulin-producing cell composition.

Clause 44. The collagen-insulin-producing cell composition of clause 43 in semi-solid solid form.

Clause 45. The collagen-insulin-producing cell composition of clauses 43-44, wherein the collagen is polymerized collagen.

Clause 46. The collagen-insulin-producing cell composition of clause 45, wherein the polymerized collagen is polymerized oligomeric collagen.

Clause 47. The collagen-insulin-producing cell composition of clause 46, wherein the polymerized collagen is type I oligomeric collagen.

Clause 48. The collagen-insulin-producing cell composition of clauses 43-47, wherein at least some portion of the collagen is a fibril network.

Clause 49. The collagen-insulin-producing cell composition of clauses 43-48, wherein substantially all of the collagen is a fibril network.

Clause 50. The collagen-insulin-producing cell composition of clauses 43-49, wherein the insulin-producing cells are islets.

Clause 51. The collagen-insulin-producing cell composition of clause 50, wherein the islets are pancreatic islets.

Clause 52. The collagen-insulin-producing cell composition of clause 50, wherein the islets are autograft islets.

Clause 53. The collagen-insulin-producing cell composition of clause 50, wherein the islets are allogeneic islets.

Clause 54. The collagen-insulin-producing cell composition of clause 50, wherein the islets are xenogeneic islets.

Clause 55. The collagen-insulin-producing cell composition of clause 50, wherein the islets are derived from a genetically modified animal.

Clause 56. The collagen-insulin-producing cell composition of clauses 43-49, wherein the insulin-producing cells are stem cell-derived insulin-producing cells.

Clause 57. The collagen-insulin-producing cell composition of clause 56, wherein the stem-cell derived insulin-producing cells are derived from induced pluripotent stem cells, embryonic stem cells, or adult stem cells.

Clause 58. The collagen-insulin-producing cell composition of clauses 43-49, wherein the insulin-producing cells are progenitor-derived insulin-producing cells.

Clause 59. The collagen-insulin-producing cell composition of clauses 43-49, wherein the insulin-producing stem cells are genetically modified.

Clause 60. The collagen-insulin-producing cell composition of clauses 43-59, wherein the collagen encapsulates the insulin-producing cells.

Clause 61. The collagen-insulin-producing cell composition of clauses 48-60, wherein the fibrillar-network forms in vivo.

Clause 62. The collagen-insulin-producing cell composition of clauses 43-61, capable of sustaining islets in vivo for at least 14 days.

Clause 63. The collagen-insulin-producing cell composition of clause 62, capable of sustaining islets in vivo for at least 90 days.

Clause 64. The collagen-insulin-producing cell composition of clauses 43-63, capable of lowering blood glucose levels in a mammal to normoglycemia.

Clause 65. The collagen-insulin-producing cell composition of clauses 43-64 in a mammal.

Clause 66. The collagen-insulin-producing cell composition of clause 65, wherein the mammal is a human.

Clause 67. The collagen-insulin-producing cell composition of clauses 43-66, wherein the stiffness of the collagen-insulin-producing cell composition is between about 40 Pa and about 2 MPa.

Clause 68. The collagen-insulin-producing cell composition of clause 67, wherein the stiffness of the collagen-insulin-producing cell composition is between about 100 Pa and 1 MPa.

Clause 69. The collagen-insulin-producing cell composition of clause 67, wherein the stiffness of the collagen-insulin-producing cell composition is between about 200 Pa and 1 MPa.

Clause 70. The collagen-insulin-producing cell composition of clause 67, wherein the stiffness of the collagen-insulin-producing cell composition is between about 300 Pa and 500 KPa.

Clause 71. The collagen-insulin-producing cell composition of clause 67, wherein the stiffness of the collagen-insulin-producing cell composition is between about 500 Pa and 100 KPa.

Clause 72. The collagen-insulin-producing cell composition of clause 67, wherein the stiffness of the collagen-insulin-producing cell composition is between about 500 Pa and 5 KPa.

Clause 73. The collagen-insulin-producing cell composition of clause 67, wherein the stiffness of the collagen-insulin-producing cell composition is between about 800 Pa and 3 KPa.

Clause 74. The collagen-insulin-producing cell composition of clause 67, wherein the stiffness of the collagen-insulin-producing cell composition is between about 900 Pa and 2.5 KPa.

Clause 75. The collagen-insulin-producing cell composition of clause 67, wherein the stiffness of the collagen-insulin-producing cell composition is between about 1 KPa and 2 KPa.

Clause 76. The collagen-insulin-producing cell composition of clause 67, wherein the stiffness of the collagen-insulin-producing cell composition is about 1 Kpa.

Clause 77. The collagen-insulin-producing cell composition of clause 67, wherein the stiffness of the collagen-insulin-producing cell composition is about 2 KPa.

Clause 78. The collagen-insulin-producing cell composition of clauses 43-77 further comprising an active pharmaceutical ingredient.

Clause 79. The collagen islet composition of clause 78, wherein the active pharmaceutical ingredient is an immunosuppressing agent.

Clause 80. The collagen-insulin-producing cell composition of clause 79, wherein the immunosuppressing agent is mycophenolic acid, mycophenolate mofetil, or a combination thereof.

Clause 81. The collagen-insulin-producing cell composition of clauses 43-80, further comprising non-islet cells.

Clause 82. The collagen-insulin-producing cell composition of clause 58, wherein the non-islet cells are endothelial colony-forming cells.

Clause 83. A method of treating metabolic disorders by administering to a patient in need thereof a composition of clauses 43-82.

Clause 84. A method of lowering blood glucose by administering to a patient in need thereof a composition of clauses 43-82.

Clause 85. A process for making a solid collagen-insulin-producing cell composition of clauses 43-84 comprising combining an acidic type I collagen oligomer solution with a self-assembly reagent to make a combined solution; adding islets to the combined solution to make a suspension to form a semisolid collagen-insulin-producing cell composition.

Clause 86. The process of clause 85, wherein the suspension is heated.

Clause 87. The process of clause 86, wherein the heating is done by administering the suspension to a mammal.

Clause 88. The process of clause 87, wherein the mammal is a human.

Clause 89. A method of administering collagen-insulin-producing cell composition of clauses 43-82, comprising implanting a graft of collagen-insulin-producing cell composition into a human.

Clause 90. A method of controlling blood glucose by administering to a patient in need thereof a composition of clauses 43-82.

Clause 91. The method of clause 83, wherein the metabolic disorder is type 1 diabetes.

Clause 92. Stable collagen-insulin-producing cell composition of clauses 43-82.

Clause 93. The collagen-insulin-producing cell composition of clause 92, wherein the composition is stable in vitro for at least 14 days.

Clause 94. The method of clauses 83-89 wherein the collagen-insulin-producing cell composition is injected into a mammal subcutaneously.

Clause 95. The method of clauses 83-89 wherein the collagen-insulin-producing cell composition is implanted into a mammal.

Clause 96. The method of clauses 94-95 wherein the mammal is a dog, cat, rodent, porcine, or human.

Clause 97. The method of clause 96, wherein there is no foreign body response.

Clause 98. The method of clause 96, wherein there is no visible foreign body response.

Clause 99. The collagen-insulin-producing cell composition of clauses 43-82, wherein when the composition is placed in vivo in a mammal, there is no foreign body response.

Clause 100. The collagen-insulin-producing cell composition of clauses 43-82, wherein when the composition is placed in vivo in a mammal, there is no visible foreign body response.

Clause 101. The collagen-insulin-producing cell composition of clauses 43-82 in vivo in a mammal, wherein the composition is capable of promoting vascularization of tissue surrounding the composition.

Clause 102. The collagen-insulin-producing cell composition of clauses 43-82 in vivo in a mammal, wherein the composition promotes vascularization of tissue surrounding the composition.

Clause 103. A method of reversing diabetes by administering to a mammal with diabetes an effective amount of a composition of clauses 43-82 and 99-102.

Clause 104. The method of clause 103, wherein the mammal is a dog, cat, rodent, porcine, or human.

Clause 105. The method of clauses 103-104, wherein the diabetes is reversed within 24 hours of administration.

We claim:

1. An immunoprotective collagen construct formed by the steps of:
   injecting a polymerizable cell suspension into a mammalian host, said polymerizable cell suspension consisting of collagen and pancreatic islet cells in an aqueous-based suspension, wherein said collagen present in said polymerizable cell suspension comprises soluble oligomeric type I collagen, and said pancreatic islet cells are dispersed throughout said polymerizable cell suspension; and
   polymerizing said polymerizable cell suspension in situ to form said immunoprotective collagen construct, wherein said immunoprotective collagen construct has islet-induced collagen-fibril reorganization and alignment.

2. An injectable immunoprotective polymerizable collagen suspension consisting of Type I oligomeric collagen, allogeneic or xenogeneic insulin-producing cells in an aqueous-based suspension, wherein said allogeneic or xenogeneic insulin-producing cells are dispersed throughout said injectable immunoprotective polymerizable collagen suspension, and the Type I oligomeric collagen in said injectable immunoprotective polymerizable collagen suspension has a concentration between about 1.5 mg/mL and about 5.0 mg/mL, further wherein, upon polymerization of said injectable immunoprotective polymerizable cell suspension, an oligomeric collagen scaffold is formed having a stiffness of 40 Pa to 2 MPa.

3. The immunoprotective suspension of claim 2, wherein said injectable immunoprotective polymerizable cell suspension consists of oligomeric type I collagen and allogeneic insulin-producing cells in an aqueous-based suspension.

4. The immunoprotective suspension of claim 2, wherein said allogenic insulin-producing cells comprise pancreatic beta cells.

5. A method of treating a metabolic disorder in a human by:

administering to the human an effective amount of the immunoprotective suspension of claim 2; or implanting into the human a polymerized oligomeric collagen construct consisting of collagen and allogeneic or xenogeneic insulin-producing cells in an aqueous-based suspension wherein said collagen present in said polymerized oligomeric collagen construct comprises oligomeric type I collagen, and said allogeneic or xenogeneic insulin-producing cells are dispersed throughout said polymerized oligomeric collagen construct.

6. The method of claim 5, wherein the metabolic disorder is diabetes and an effective amount of the immunoprotective suspension is injected into the human, wherein polymerization of the injected immunoprotective suspension results in the formation of a fibrillar collagen network and encapsulation of the insulin-producing cells in vivo.

7. The method of claim 6, wherein the immunoprotective suspension is administered via subcutaneous injection.

8. The method of claim 5, which consists of a single step of injecting said immunoprotective suspension into said human.

* * * * *